(12) United States Patent
Lee

(10) Patent No.: US 10,668,434 B2
(45) Date of Patent: Jun. 2, 2020

(54) MEMBRANE FILTRATION SYSTEM AND MEMBRANE BIOREACTOR INCLUDING THE SAME

(71) Applicant: DOOSAN HEAVY INDUSTRIES CONSTRUCTION CO., LTD., Changwon-si, Gyeongsangnam-do (KR)

(72) Inventor: Woo Nyoung Lee, Seongnam-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 361 days.

(21) Appl. No.: 15/657,105

(22) Filed: Jul. 21, 2017

(65) Prior Publication Data

US 2018/0147538 A1 May 31, 2018

(30) Foreign Application Priority Data

Nov. 30, 2016 (KR) .................. 10-2016-0162322
Nov. 30, 2016 (KR) .................. 10-2016-0162323

(51) Int. Cl.
*B01D 63/16* (2006.01)
*B01D 63/04* (2006.01)
(Continued)

(52) U.S. Cl.
CPC ............ *B01D 63/16* (2013.01); *B01D 61/22* (2013.01); *B01D 63/04* (2013.01); *C02F 3/1268* (2013.01); *C02F 3/1273* (2013.01); *C02F 3/2853* (2013.01); *B01D 2313/06* (2013.01); *B01D 2313/12* (2013.01); *B01D 2313/14* (2013.01); *B01D 2313/90* (2013.01); *B01D 2315/04* (2013.01); *B01D 2315/06* (2013.01); *C02F 2203/006* (2013.01)

(58) Field of Classification Search
CPC .... B01D 63/04; B01D 63/16; B01D 2313/06; B01D 2315/04
See application file for complete search history.

(56) References Cited

U.S. PATENT DOCUMENTS 6,284,135 B1 * 9/2001 Ookata ................. B01D 61/18
210/220
7,122,121 B1 10/2006 Ji
(Continued)

FOREIGN PATENT DOCUMENTS

CN      205687746 U    11/2016
KR      20140058111 A   5/2014
(Continued)

*Primary Examiner* — Patrick Orme
(74) *Attorney, Agent, or Firm* — Invenstone Patent, LLC

(57) ABSTRACT

A membrane filtration system, capable of effectively removing foreign matter attached to a separation membrane while saving energy by reciprocating the separation membrane, includes a treatment bath, a membrane support frame disposed in the treatment bath, a separation membrane module installed in the membrane support frame, a reciprocating part connected with the membrane support frame to reciprocate the membrane support frame, a sludge floating part disposed on a lower end of the membrane support frame to float sludge accumulated in the treatment bath, and a control part controlling a reciprocating distance or frequency of the separation membrane module.

20 Claims, 22 Drawing Sheets

(51) Int. Cl.
*B01D 61/22* (2006.01)
*C02F 3/12* (2006.01)
*C02F 3/28* (2006.01)

(56) References Cited

U.S. PATENT DOCUMENTS 8,287,733 B2 10/2012 Nick et al.
2009/0250394 A1 10/2009 Taylor
2014/0097132 A1* 4/2014 Ho .................... B01D 65/02
                                                       210/150

FOREIGN PATENT DOCUMENTS

KR      20150096647 A    8/2015
WO      2012083390 A2    6/2012

* cited by examiner

MEMBRANE FILTRATION SYSTEM AND MEMBRANE BIOREACTOR INCLUDING THE SAME

CROSS-REFERENCE TO RELATED APPLICATIONS

This application claims priority to Korean Patent Application Nos. 10-2016-0162322 and 10-2016-0162323, both filed on Nov. 30, 2016, the disclosures of which are incorporated herein by reference in their entirety.

BACKGROUND

Field

Exemplary embodiments of the present disclosure relate to a membrane filtration system and a membrane bioreactor including the system, and more particularly, to a membrane filtration system and a membrane bioreactor, capable of effectively removing foreign matter attached to a separation membrane while saving energy by reciprocating the separation membrane.

Description of the Related Art

Generally, separation membrane technology is one of separation technologies using selective permeability of polymeric materials. Unlike distillation technology, a membrane separation process does not involve phase change. Thus, the membrane separation process is advantageous in that it is possible to save energy while needing only a small space due to the simplicity of the process. A separation membrane has been developed mainly as a reverse osmosis membrane, and is applied to a wide variety of fields including ultrafiltration, microfiltration, nanofiltration, etc.

A membrane bioreactor that is one of membrane filtration systems employs the separation membrane, instead of a settling bath used in a final treatment step of an existing biological treatment process.

This has many advantages in that efficiency of treating organic and nitrogen components is enhanced by keeping the concentration of microorganisms in the reactor high, and solid/liquid separation efficiency is enhanced by removing suspended matter, microorganisms and others using the separation membrane, solving the problems of the existing biological treatment process.

The membrane bioreactor has a smaller site area and is higher in treatment efficiency of the system as compared to a conventional activated sludge process. Further, it is expected that the use of the membrane bioreactor will continuously increase to cope with an increasing demand for water and stringent water quality regulations due to population growth and urbanization.

Generally, a submerged membrane bioreactor refers to a reactor that directly submerges a separation membrane module in a secondary bioreactor to enable solid/liquid separation, unlike an existing membrane-coupled treatment system used in a process subsequent to secondary biological treatment. This is intended to achieve dual effects of increasing water quality to a high level while performing simple solid/liquid separation.

Meanwhile, in most membrane bioreactor (MBR) processes, when the separation membrane module is submerged in the bioreactor, the separation membrane module corresponding to a processing capacity is fixedly installed in a separate frame. Thus, filtration using the separation membrane involves discharging treated water through a filtration pipe after collecting water at an upper position or both ends according to the type of the separation membrane module.

However, suspended matter or the like may attach to a surface of the membrane during the filtration process, thus undesirably blocking the flow of water. As the membrane is contaminated, the filtering capacity of the membrane bioreactor gradually decreases while the transmembrane pressure increases, and it is difficult to clean the contaminated membrane.

Various application methods of conventional technology for treating sewage and waste water using the separation membrane have been constantly researched in Europe and Japan. However, until the early 1990s, this technology did not develop into practical application technology due to high separation-membrane cost and energy cost and the problem of blocking of the membrane, staying limited to an academic research field or a special case.

Since the early 1990s, there has been proposed a submerged or an activated sludge-coupled separation membrane which is submerged in the activated sludge reactor and employs upward water stream generated by air bubbles during an aeration process to effectively inhibit the separation membrane from being blocked. Therefore, the membrane blocking problem was considerably mitigated, which was the biggest problem arising when the separation membrane technology was applied to a site.

Conventionally, an air refining method is used to clean the blocked membrane. As one of air refining methods, there is used a method of spraying air onto an outer wall of the separation membrane using upward water stream, thus removing sludge from the membrane while minimizing damage to the membrane.

However, such an air refining method is problematic in that it needs to be performed throughout the entire separation membrane, so that energy consumption is considerably high.

SUMMARY

Accordingly, the present exemplary embodiments have been developed keeping in mind the above problems occurring in the related art, and to provide a membrane filtration system and a membrane bioreactor including the system, capable of effectively removing foreign matter attached to a separation membrane while saving energy by reciprocating the separation membrane.

In accordance with one aspect, there is provided a membrane filtration system, including a treatment bath, a membrane support frame disposed in the treatment bath, a separation membrane module installed in the membrane support frame, a reciprocating part connected with the membrane support frame to reciprocate the membrane support frame, and a sludge floating part disposed on a lower end of the membrane support frame to float sludge accumulated in the treatment bath, and a control part controlling a reciprocating distance and/or frequency of the separation membrane module.

The control part may include a contamination measuring part measuring a contamination level of the separation membrane module, and a regulating control part controlling the reciprocating distance and/or frequency of the separation membrane module depending on the contamination level measured by the contamination measuring part.

The contamination measuring part may measure a transmembrane pressure (TMP) of the separation membrane module.

The regulating control part may increase the frequency of the separation membrane module as the contamination level of the separation membrane module becomes high, and may reduce the frequency of the separation membrane module as the contamination level of the separation membrane module becomes low.

The regulating control part may increase the reciprocating distance of the separation membrane module as the contamination level of the separation membrane module becomes high, and may reduce the reciprocating distance of the separation membrane module as the contamination level of the separation membrane module becomes low.

The reciprocating part may include a reciprocating frame connected with the membrane support frame, and a drive part disposed in the treatment bath, connected to a side of the reciprocating frame, and moving the reciprocating frame.

The regulating control part may be connected with the reciprocating part to regulate the reciprocating distance and/or frequency of the reciprocating frame.

The drive part may include a motor disposed on the treatment bath, a first pulley mounted to a shaft of the motor, a second pulley connected with the first pulley via a power transmission belt to receive a rotating motion, a rotor connected to a rotating shaft of the second pulley, and a link rod connected between the rotor and the reciprocating frame to convert the rotating motion into a reciprocating motion, wherein the regulating control part controls a speed of the motor, thus regulating the frequency of the separation membrane module.

A plurality of connecting holes connected with the link rod may be formed in the rotor, and the plurality of connecting holes may be arranged at different intervals from a center of the rotor.

The link rod may include a link body, a first link hole disposed in a side of the link body and coupled to an associated connecting hole of the rotor, and a second link hole disposed in another side of the link body and coupled to the reciprocating frame, wherein a plurality of first link holes may be formed in a longitudinal direction of the link body.

The regulating control part may control the reciprocating distance of the separation membrane module by regulating a position of the connecting hole where the link rod is connected to the rotor, or by regulating a position of the first link hole of the link rod connected to the connecting hole of the rotor.

The regulating control part may control to increase the frequency during the backwash of the separation membrane module.

The reciprocating part may be disposed on a side of the treatment bath, and a plurality of membrane support frames may be arranged in a row in the reciprocating frame, the plurality of membrane support frames being driven by one drive part.

The reciprocating part may be disposed on both sides of the treatment bath, and the plurality of membrane support frames forms a set and is arranged in a row in the reciprocating frame of each of the reciprocating part, the membrane support frames divided into two sets on both sides being driven by different drive parts.

Reciprocating frames disposed on both sides of the treatment bath may be reciprocated in different directions.

The reciprocating part may be disposed on a side of the treatment bath, and a plurality of membrane support frames may be arranged in parallel in a plurality of rows in the reciprocating frame, the plurality of membrane support frames being driven by one drive part.

The reciprocating part may be disposed in parallel in a plurality of rows on a side of the treatment bath, and a plurality of membrane support frames may be arranged in a row in the reciprocating frame of the reciprocating part in each of the rows, the plurality of membrane support frames of the respective rows being driven by different drive parts.

The plurality of reciprocating frames may be disposed in parallel in the treatment bath such that neighboring reciprocating frames may reciprocate in different directions.

The reciprocating frame may be formed to have a plurality of compartments, and the membrane support frames may be individually installed in the respective compartments.

Further, the invention provides a membrane bioreactor, including a biological treatment train performing at least one biological treatment process among anaerobic, anoxic and aerotropic processes, and a membrane filtration system according to the above-described aspects.

According to an exemplary embodiment, it is possible to effectively prevent foreign matter from being attached to a separation membrane or to effectively remove the foreign matter by reciprocating the separation membrane via a reciprocating part.

The present invention includes a control part that controls a reciprocating distance and/or frequency of a separation membrane module, thus being capable of regulating the reciprocating distance and/or frequency of the separation membrane module depending on a contamination level of the separation membrane module, an operating condition and others.

Thus, when the contamination level of the separation membrane module is high, inertial force acting on a separation membrane increases, thus effectively detaching and removing contaminants from the separation membrane, and saving energy consumption.

Consequently, it is possible to save energy used to clean a separation membrane, as compared to a conventional air refining method.

It is to be understood that the exemplary embodiments are not limited to the above-described effects and other effects are also embraced without departing from the scope of the disclosure as defined in the following claims.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

Figure 1:
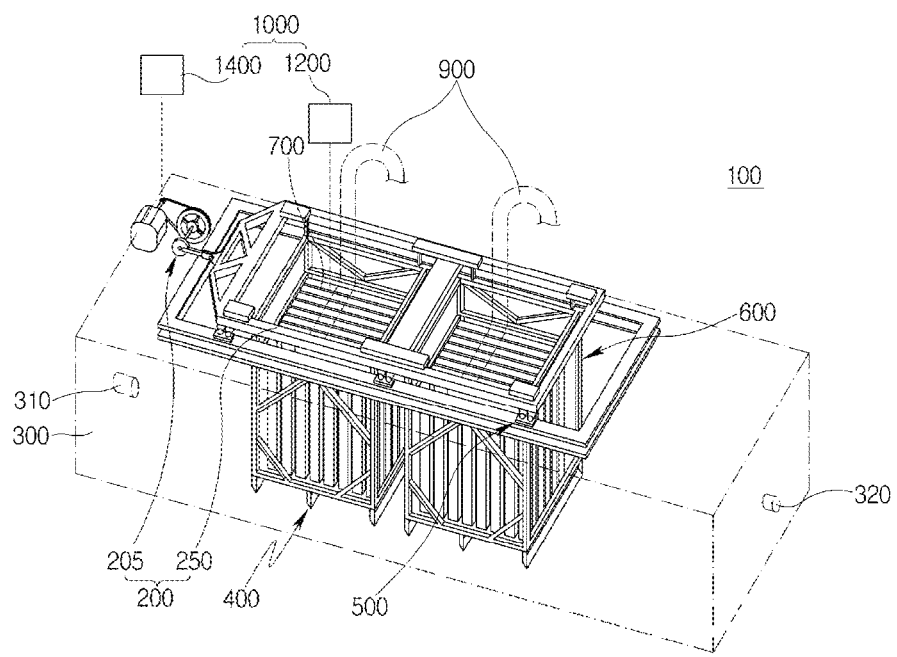
FIG. 1 is a perspective view illustrating an exemplary embodiment of a membrane filtration system.

Hereinafter, a membrane filtration system and a membrane bioreactor including the system according to an exemplary embodiment will be described with reference to FIGS. 1 to 33. For the purpose of clarity, a duplicated description will be omitted herein, and like components will carry like reference numerals throughout the drawings. The term "includes" means that a part may further include other components without excluding the components, unless otherwise stated.

A membrane bioreactor according to an exemplary embodiment may include a biological treatment train performing at least one biological treatment process among anaerobic, anoxic and aerotropic processes, and a membrane filtration system performing filtration by a reciprocating membrane. Specifically, influent water that is to be treated is introduced into the biological treatment train, and several biological treatment processes including the anaerobic, anoxic and aerotropic processes may be performed in the treatment train. That is, an anaerobic process bath for treating influent water in the absence of dissolved oxygen, an anoxic bath for treating influent water under the oxygen depleted condition, an aerotropic process bath for treating influent water in the presence of dissolved oxygen and others may be arranged in various ways in the order of processes to perform a series of biological treatment processes.

Next, mixed liquid from the biological treatment train may be physically filtered by the membrane filtration system, and complete solid-liquid separation may be performed by the separation membrane, for example. This will be described below in detail. Further, a part of activated sludge, or return activated sludge (RAS) returns to the biological treatment train to maintain a sludge concentration in the train. Particularly, as will be described later, since air refining in the membrane filtration system is not utilized, the presence of the dissolved oxygen in the activated sludge (RAS) may be reduced or eliminated, and thereby the activated sludge may be carried from the membrane filtration system to the anoxic bath or the anaerobic process bath. In this regard, the membrane filtration system may include a membrane tank separately from the biological treatment train to be arranged therein, or may be disposed in the biological treatment bath.

Hereinafter, the membrane filtration system 100 of an exemplary embodiment will be described in detail.

First, referring to FIG. 1, the membrane filtration system 100 according to an exemplary embodiment may mainly include a treatment bath 300, a membrane support frame 600, a separation membrane module 700, a reciprocating part 200, a sludge floating part 400, a sliding part 500, and a filtered-water discharge part (not shown). According to one exemplary embodiment, a length adjusting part 740 (e.g., FIG. 23), an interval measuring unit 810 (e.g., FIGS. 16A, 16B), an interval adjusting part 870 (e.g., FIG. 17) and a control part 1000 (e.g., FIG. 1) may be further included. Although the present invention may be applied to various kinds of devices constituting the membrane filtration system, the membrane bioreactor will be described by way of example herein.

The treatment bath 300 may be provided in the form of a tank, and include an inlet port 310 into which waste water (or sewage) is introduced, and an outlet port 320 from which treated waste water (or sewage) is discharged. In one exemplary embodiment, the inlet port 310 is formed such that the influent water flows to an upper portion of the treatment bath 300. Thus, an upward flow from an inlet of the treatment bath 300 is generated, so that it is possible to prevent the influent water from staying in a lower portion of the treatment bath 300 and to more effectively perform filtration. The inlet port 310 may be formed at an upper position of a surface of the treatment bath 300. In another exemplary embodiment, a pipe structure that is bent upwards from the lower position may be provided when it is easier to form the inlet port at a lower position.

The membrane support frame 600 is disposed in the treatment bath 300 and is a component in which a membrane-type separation membrane module 700 is installed. As will be described later, the reciprocating part 200 is connected to the membrane support frame 600, and the membrane support frame 600 is reciprocated integrally with the separation membrane module 700 by the reciprocating part 200.

The reciprocating part 200 is connected to the membrane support frame 600 and may be operable to reciprocate the membrane support frame 600. Such a reciprocating part 200 may include a reciprocating frame 250 and a drive part 205. The reciprocating frame 250 is connected to the membrane support frame 600 and may be a part that supports the membrane support frame 600. Further, the drive part 205 is disposed in the treatment bath 300, is connected to a side of the reciprocating frame 250, and is configured to move the reciprocating frame 250.

Figure 2:
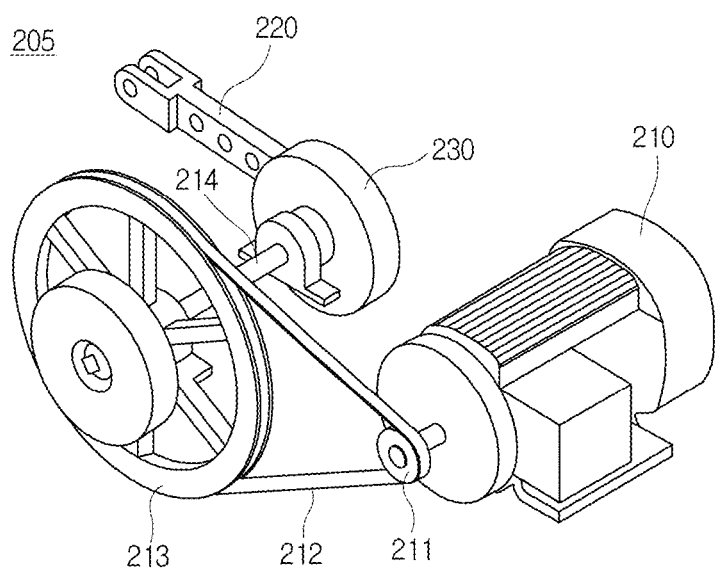
FIG. 2 is a view illustrating an exemplary structure of a reciprocating part of FIG. 1.

As shown in FIG. 2, such a drive part 205 may include a motor 210, a first pulley 211, a second pulley 213, a rotor 230, and a link rod 220. The motor 210 may be disposed at a position on an upper end of the treatment bath 300. The first pulley 211 is coupled to a shaft of the motor 210, and the second pulley 213 is connected with the first pulley 211 via a power transmission belt 212 to be rotated along therewith. The rotor 230 is rotatably connected to a rotating shaft 214 of the second pulley 213, and the link rod 220 is connected between the rotor 230 and the reciprocating frame 250 to convert a rotating motion into a reciprocating motion.

Figure 4:
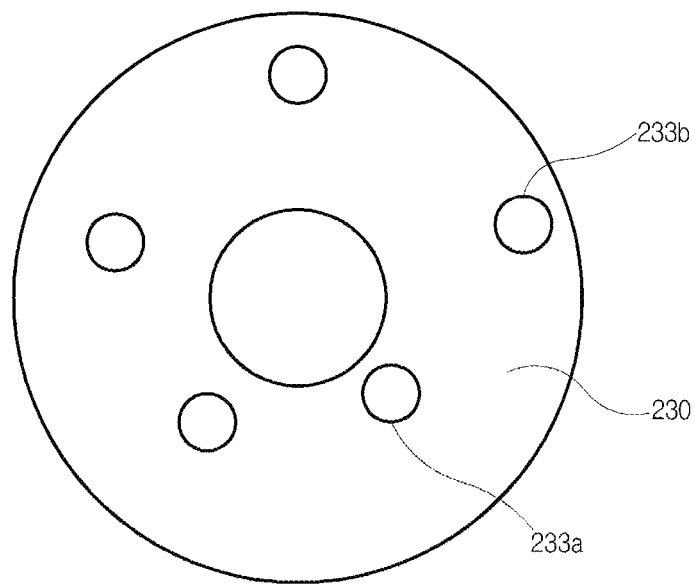
FIG. 4 is a view illustrating an exemplary rotor of FIG. 2.

In an exemplary embodiment shown in FIG. 4, a plurality of connecting holes 233a and 233b may be formed in the rotor 230. The plurality of connecting holes 233a and 233b may be arranged at different intervals from a center of the rotor 230. Referring to FIG. 4, it can be seen that five connecting holes are formed at different intervals (i.e., having different radii) from the center of the rotor 230. However, without being limited thereto, the connecting holes may be arranged in various numbers and intervals depending on the size of the rotor 230. A reciprocating distance of the reciprocating frame 250 may be changed by connecting the link rod 220 to a different connecting hole.

For example, to decrease the reciprocating distance of the reciprocating frame 250, the link rod 220 may be connected to a connecting hole 233a positioned at a relatively smaller interval from the center of the rotor 230. In this case, since a rotation radius of the connecting hole 233a is reduced when the rotor 230 rotates, the reciprocating distance of the link rod 220 becomes shorter. This reduces the reciprocating distance of the reciprocating frame 250.

In contrast, to increase the reciprocating distance of the reciprocating frame 250, the link rod 220 may be connected to a connecting hole 233b positioned at a relatively larger interval from the center of the rotor 230. In this case, since a rotation radius of the connecting hole 233b is increased when the rotor 230 rotates, the reciprocating distance of the link rod 220 becomes longer. This increases the reciprocating distance of the reciprocating frame 250.

Figure 3:
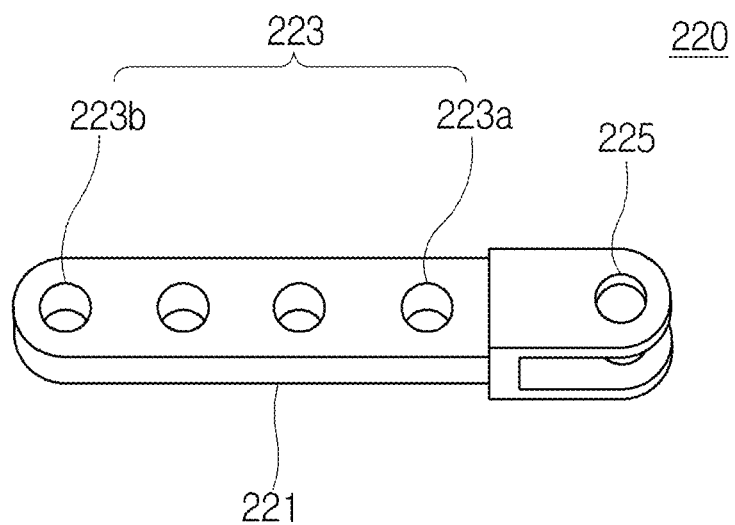
FIG. 3 is a view illustrating an exemplary link rod of FIG. 2.

In an exemplary embodiment shown in FIG. 3, the link rod 220 may include a link body 221, a plurality of first link holes 223, and a second link hole 225. The link body 221 may be provided in the form of a long bar, the plurality of first link holes 223 may be disposed in a side of the link body 221 and may be a part connected to the connecting hole 233 of the rotor 230, and the second link hole 225 may be disposed in another side of the link body 221 and may be a part connected to the reciprocating frame 250. According to an exemplary embodiment, the plurality of first link holes 223 may be formed at regular intervals in a longitudinal direction of the link body 221. Referring to FIG. 3, it can be seen that four first link holes 223 are formed in the longitudinal direction of the link body 221. However, without being limited thereto, the plurality of first link holes may be formed in various numbers depending on the size of the link body 221. A reciprocating distance of the reciprocating frame 250 may be changed by connecting the rotor 230 to a different a different one of the first link holes 223.

For example, to decrease the reciprocating distance of the reciprocating frame 250, the connecting hole 233 of the rotor 230 may be connected to the first link hole 223a that is relatively near to the second link hole 225 in the link rod 220. In this case, since the reciprocating distance of the link rod 220 becomes short when the rotor 230 rotates, the reciprocating distance of the reciprocating frame 250 is likewise reduced.

In contrast, to increase the reciprocating distance of the reciprocating frame 250, the connecting hole 233 of the rotor 230 may be connected to the first link hole 223b that is relatively remote from the second link hole 225 in the link rod 220. In this case, since the reciprocating distance of the link rod 220 becomes long when the rotor 230 rotates, the reciprocating distance of the reciprocating frame 250 is likewise increased.

According to the exemplary embodiment, if the first link hole 223b is connected with the outermost connecting hole 233b of the rotor 230, the reciprocating distance of the link rod 220 is at the maximum as the rotor 230 rotates, so that it is possible to maximize the reciprocating distance of the reciprocating frame 250. Conversely, if the first link hole 223a is connected with the connecting hole 233a that is nearest to the center of the rotor 230, the reciprocating distance of the link rod 220 is at the minimum as the rotor 230 rotates, so that it is possible to minimize the reciprocating distance of the reciprocating frame 250.

Such a reciprocating motion allows the separation membrane to be continuously moved even during the sludge filtration, thus causing the sludge to be detached by inertial force and cleaning the separation membrane. This eventually prevents the membrane from being blocked and maintains the efficiency of the system. Further, since it is possible to adjust the reciprocating distance of the reciprocating frame 250, it is possible to efficiently regulate a reciprocating distance (i.e., amplitude) according to a contamination level of the separation membrane module 700 by measuring transmembrane pressure (TMP), in addition to saving energy. This will be described in detail below.

In an exemplary embodiment, the sliding part 500 is disposed in the treatment bath 300, is linked to the reciprocating part 200, and is operable to guide a moving direction of the membrane support frame 600. The sliding part 500 may be present in four exemplary embodiments. Hereinafter, respective embodiments will be described.

First Exemplary Embodiment

Figure 5:
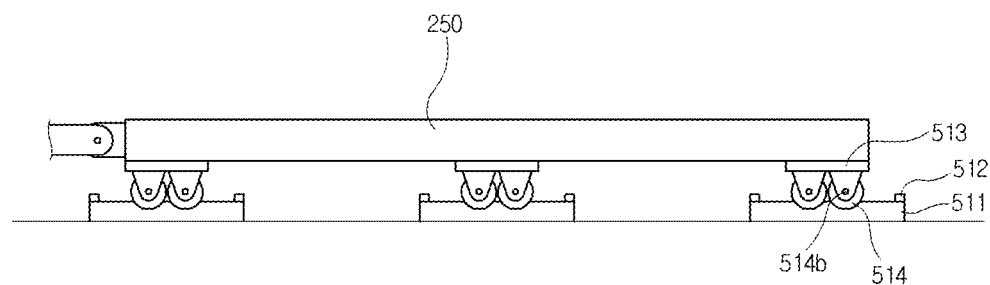
FIG. 5 is a side view illustrating a first exemplary embodiment of a sliding part of FIG. 1.
Figure 6:
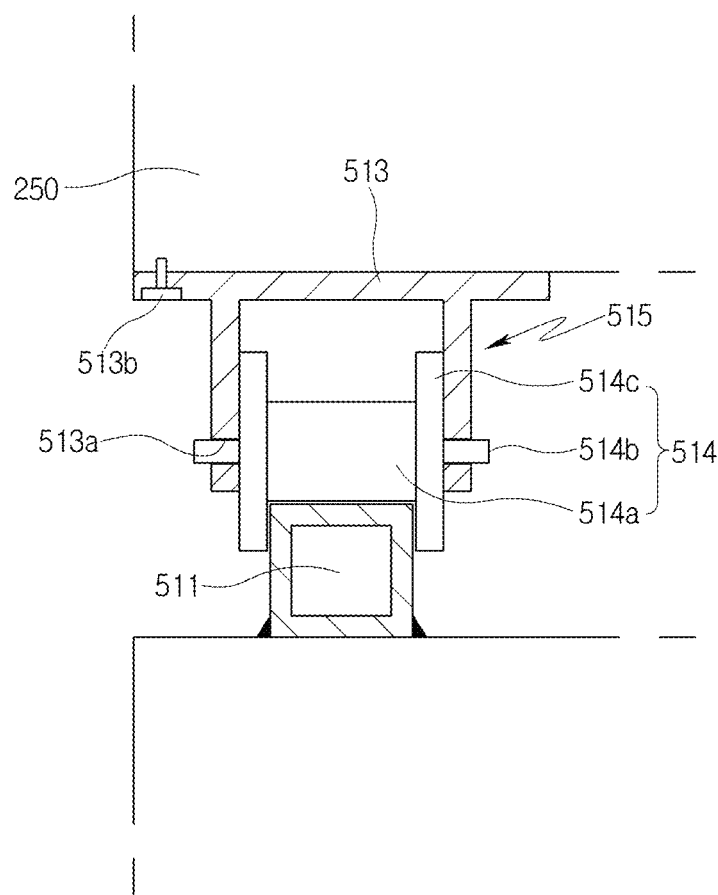
FIG. 6 is a front sectional view of FIG. 5.

FIGS. 5 and 6 are views illustrating a first embodiment of the sliding part 500 in the invention shown in FIG. 1.

Referring to FIGS. 5 and 6, the first exemplary embodiment of the sliding part 500 may include a guide rail 511 and a rolling member 515. A pair of guide rails 511 may be provided on both sides of the treatment bath 300 in a longitudinal direction thereof by fastening a bolt or by welding. The guide rail may be formed to have a rectangular cross-section.

The rolling member 515 may be disposed on a lower end of the reciprocating frame 250 to be seated on an upper end of the guide rail 511. The rolling member 515 may include a wheel block 513 and a rolling wheel 514. The wheel block 513 may be connected to the lower end of the reciprocating frame 250 by fastening a bolt 513b or by welding. As a rotating shaft 514b of the rolling wheel 514 is fitted into a through hole 513a of the wheel block 513, it may be rotatably mounted to the wheel block 513.

The rolling wheel 514 may include a central wheel part 514a and a support wheel part 514c. The central wheel part 514a is seated on the guide rail 511 and serves to support a load of the reciprocating frame 250. The support wheel part 514c is a part that extends to a side of the guide rail 511 so as to prevent the reciprocating frame 250 from falling off of the guide rail 511 during the movement. Thus, the rolling wheel 514 stays on the guide rail 511 during the reciprocating motion to be relatively stably operated. Stoppers 512 may also be provided on both ends of the guide rail 511 to prevent the rolling wheel 514 from falling off of the guide rail 511.

Second Exemplary Embodiment

Figure 7A:
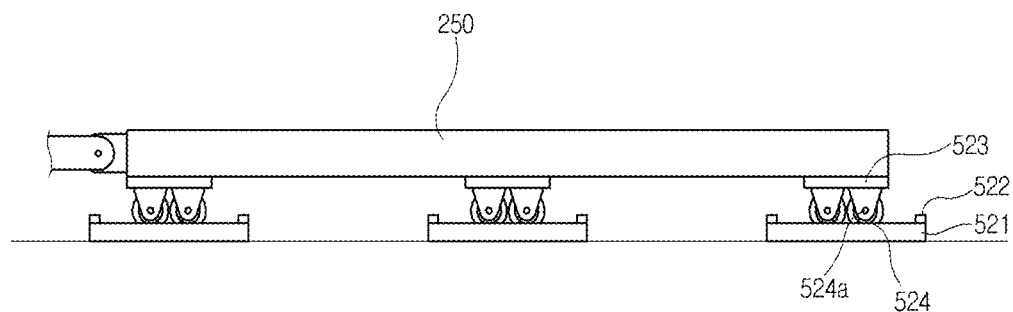
FIGS. 7A and 7B are views illustrating a second exemplary embodiment of a sliding part of FIG. 1.
Figure 7B:
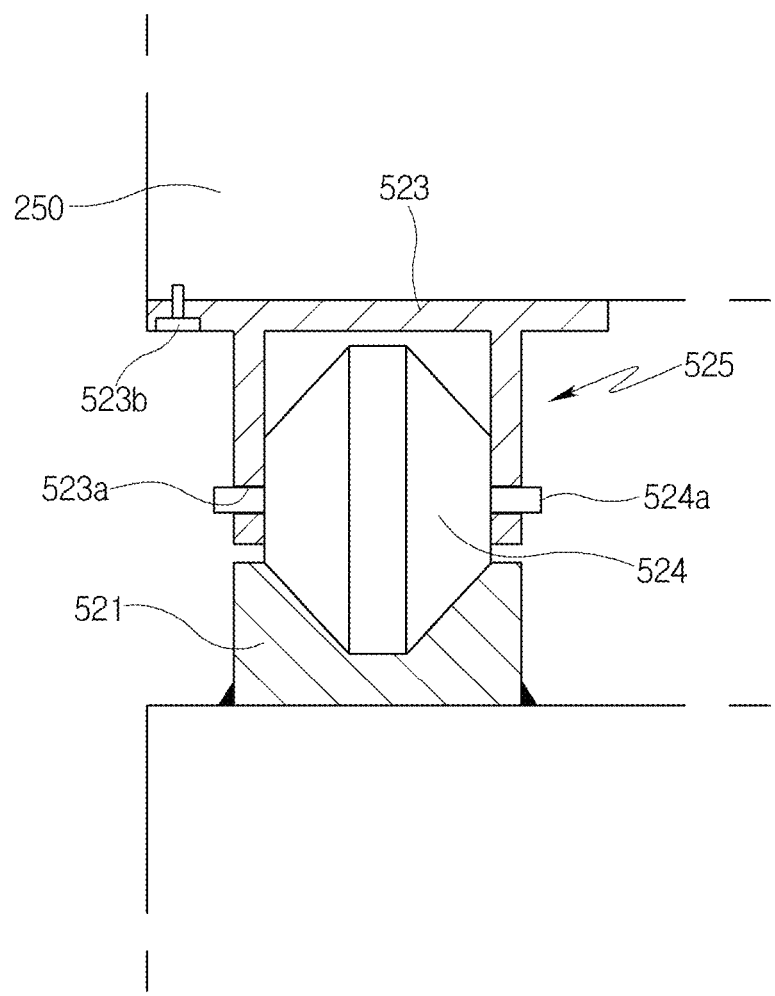

FIGS. 7A and 7B are views illustrating a second exemplary embodiment of the sliding part 500 shown in FIG. 1.

Referring to FIGS. 7A and 7B, the second exemplary embodiment of the sliding part 500 may include a guide rail 521 and a rolling member 525. A pair of guide rails 521 may be provided on both sides of the treatment bath 300 in a longitudinal direction thereof by fastening a bolt or by welding. The guide rail 521 may be provided in a tapered shape in a direction from an outer position to an inner position.

The rolling member 525 is disposed on each of opposite sides of a lower end of the reciprocating frame 250 and includes a wheel support 523 and a tapered wheel 524. The wheel support 523 may be connected to the lower end of the reciprocating frame 250 by fastening a bolt 523b or by welding. A rotating shaft 524a of the tapered wheel 524 is rotatably fitted into a through hole 523a of the wheel support 523 and may be provided in a tapered shape in a direction from a center to an outer position.

Since the tapered shape of the guide rail 521 and the tapered shape of the tapered wheel 524 correspond to each other, the rolling member 525 is stably seated on an upper end of the guide rail 521, thus allowing the reciprocating frame 250 to be smoothly operated. Stoppers 522 may be disposed on both ends of the guide rail 521 to prevent th the tapered wheel 524 from falling off of the guide rail 521.

Third Exemplary Embodiment

Figure 8A:
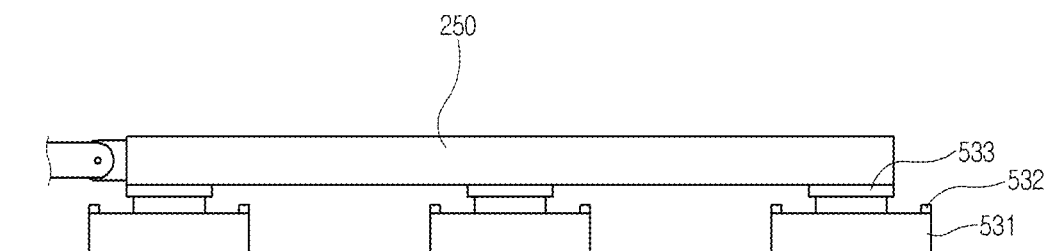
FIGS. 8A and 8B are views illustrating a third exemplary embodiment of a sliding part of FIG. 1.
Figure 8B:
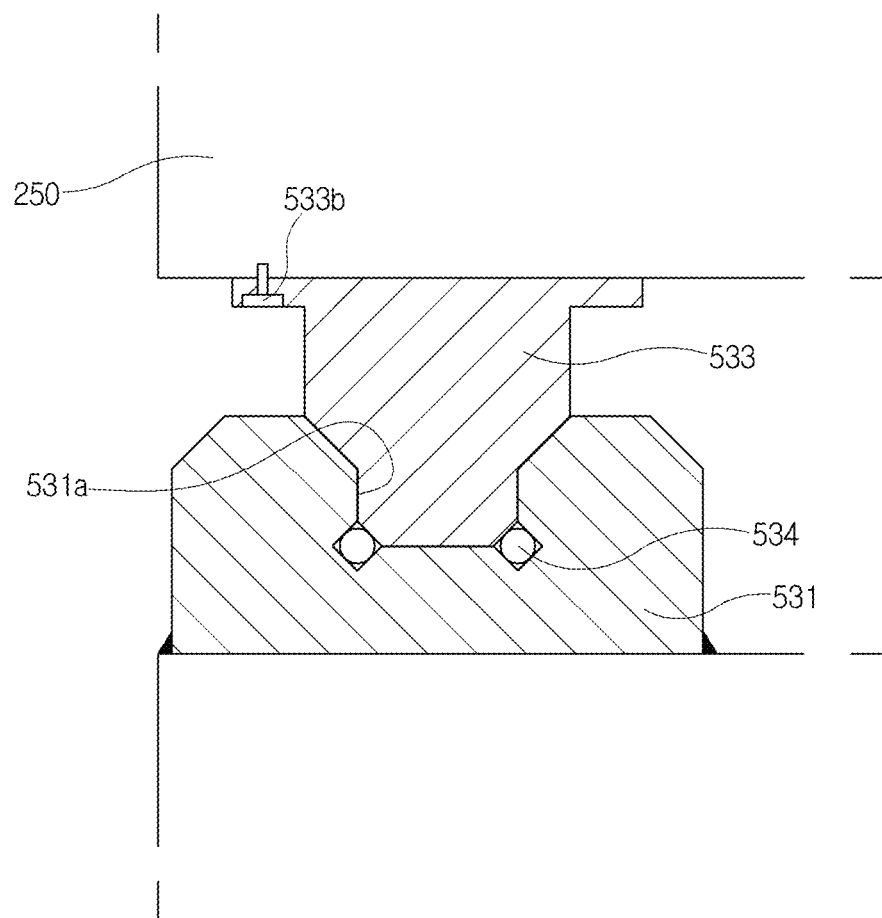

FIGS. 8A and 8B are views illustrating a third exemplary embodiment of the sliding part 500 of FIG. 1.

Referring to FIGS. 8A and 8B, the third exemplary embodiment of the sliding part 500 may include a linear guide 531, ball bearings 534, and a movable beam 533. A pair of linear guides 531 may be provided on both sides of the treatment bath 300 in a longitudinal direction thereof by fastening a bolt or by welding. The ball bearings 534 may be disposed on a portion of the linear guide 531 on which the movable beam 533 is seated so as to allow a smooth movement.

The movable beam 533 may be connected to the lower end of the reciprocating frame 250 by fastening a bolt 533b or by welding, and may be seated on the linear guide 531. If the reciprocating frame 250 is reciprocated by the drive part 205, the movable beam 533 moves on the linear guide 531. Since the movable beam 533 is moved while being seated in an inner groove 531a of the linear guide 531, the beam may be stably operated without being removed from a predetermined position. Further, stoppers 532 may be disposed on both ends of the linear guide 531 to prevent the movable beam 533 from being moved beyond a predetermined range in a longitudinal direction.

Fourth Exemplary Embodiment

Figure 9A:
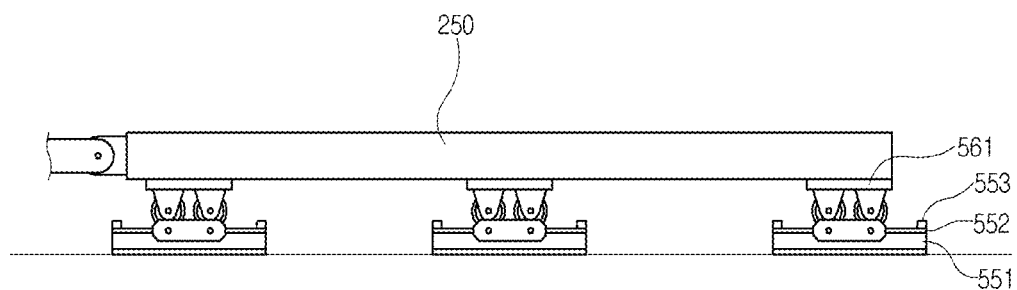
FIGS. 9A and 9B are views illustrating a fourth exemplary embodiment of a sliding part of FIG. 1.
Figure 9B:
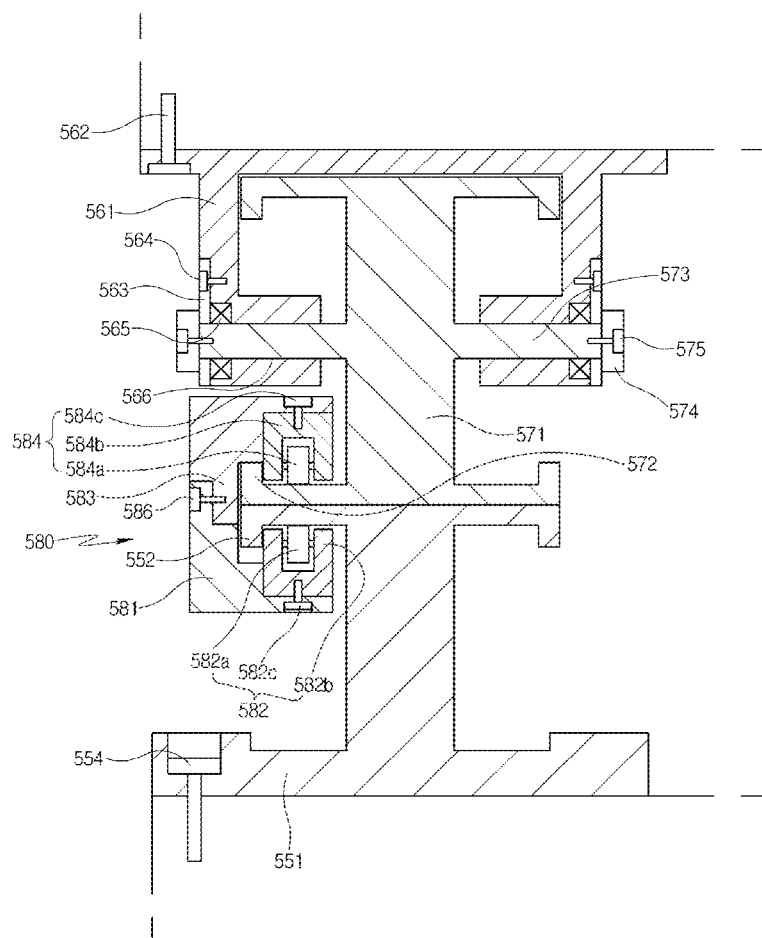

FIGS. 9A and 9B are views illustrating a fourth exemplary embodiment of the sliding part 500 of FIG. 1.

Referring to FIGS. 9A and 9B, the fourth exemplary embodiment of the sliding part 500 includes a guide rail 551, a wheel block 561, a rolling wheel 571 and a support unit 580. A pair of guide rails 551 may be provided on both sides on the upper end of the treatment bath 300 in a longitudinal direction thereof by fastening a bolt 554 or by welding. The guide rail 551 may be formed in the shape of an I beam and a first protrusion 552 extending downwards may be linearly arranged along the guide rail 551 to form an edge portion of an upper end of the guide rail 551.

The wheel block 561 may be coupled to the lower end of the reciprocating frame 250 by fastening a bolt 562 or by welding, and the rolling wheel 571 may be rotatably mounted on the wheel block 561. Specifically, the rolling wheel 571 may be rotatably connected to the wheel block 561 by fitting a rotating shaft 573 of the rolling wheel 571 into a through hole 566 of the wheel block 561 and then fastening a wheel cap 574 via a bolt 575. A bearing 565 may be disposed on the wheel block 561 to allow the rolling wheel 571 to be smoothly rotated and a shaft cover 563 may be fixed by a bolt 564. The rolling wheel 571 may be implemented in a disc shape. A second protrusion 572 protruding towards a center of the rolling wheel 571 may be formed on an outer circumference of the rolling wheel in a circumferential direction thereof.

The support unit 580 may be disposed between the rolling wheel 571 and the guide rail 551 to be operated in conjunction with each other, thus preventing the rolling wheel 571 from falling off of the guide rail 551. Such a support unit 580 may include a first body part 581, a second body part 583, a first support wheel 582 and a second support wheel 584.

The first body part 581 may be a part that is fitted onto the first protrusion 552 of the guide rail 551. The first support wheel 582 is disposed inside the first body part 581 and the first support wheel 582 performs a rectilinear motion while rolling along the first protrusion 552. The first support wheel 582 may be configured such that a rotary wheel 582a is mounted on a wheel body 582b and the wheel body 582b is fixed on the first body part 581 via a bolt 582c.

The second body part 583 may be a part that is fitted onto the second protrusion 572 of the rolling wheel 571. The second support wheel 584 is disposed inside the second body part 583, and the second support wheel 584 rolls on the second protrusion 572 as the rolling wheel 571 rotates. The second support wheel 584 may be configured such that a rotary wheel 584a is mounted on a wheel body 584b and the wheel body 584b is fixed into the second body part 583 via a bolt 584c.

The first body part 581 and the second body part 583 may be connected to each other by fastening a bolt 586. In this case, since the first body part 581 and the second body part 583 support the first protrusion 552 and the second protrusion 572 to come into close contact therewith, the rolling wheel 571 may come into close contact with the guide rail 551 and thereby may move without being removed from a predetermined position.

According to the above-mentioned exemplary embodiments, the sliding part 500 allows the membrane support frame 600 to more stably and smoothly perform the rectilinear motion by the reciprocating part 200, thus saving energy and improving the movability of the separation membrane.

Hereinafter, exemplary embodiments of the sludge floating part 400. The sludge floating part 400 is included to prevent the sludge from staying in and being accumulated in the treatment bath 300 while causing the sludge to float, thus allowing a filtration operation to be easily performed via the separation membrane module.

First Exemplary Embodiment

Figure 10:
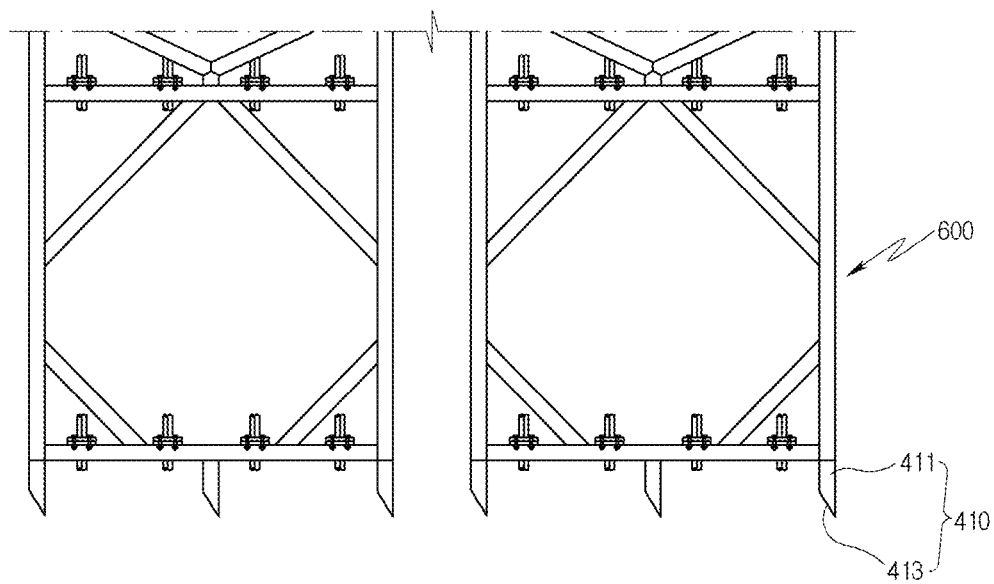
FIG. 10 is a side view illustrating an exemplary vane member.
Figure 11:
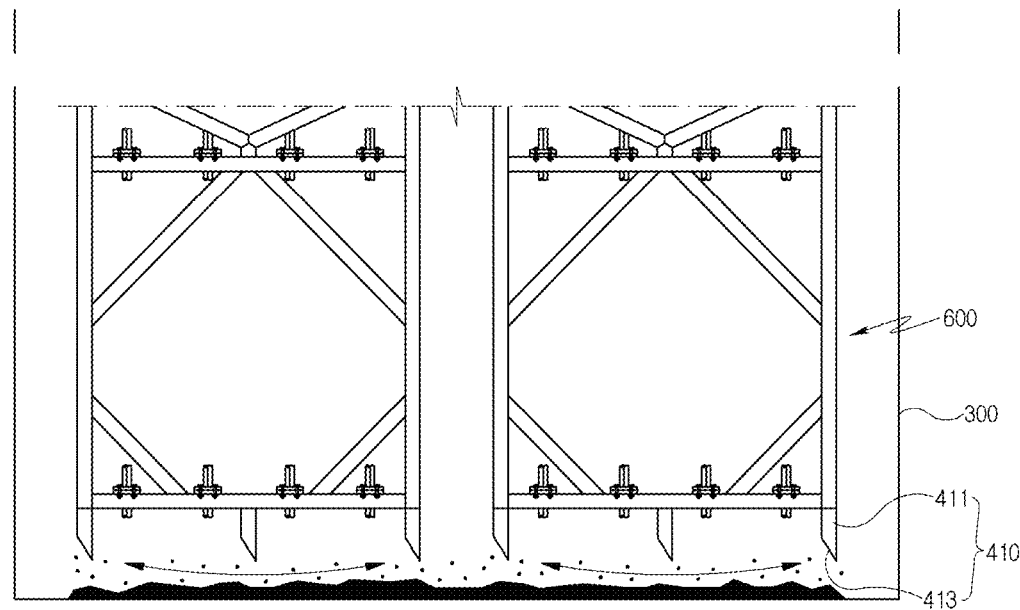
FIG. 11 is a view illustrating an exemplary operating state of FIG. 10.

According to the first exemplary embodiment, the sludge floating part 400 may be composed of a vane member 410, which will be described with reference to FIGS. 10 and 11. FIG. 10 is a side view illustrating a vane member according to an exemplary embodiment, and FIG. 11 is a view illustrating an exemplary operation state of FIG. 10.

The vane member 410 may be disposed on a lower end of the membrane support frame 600 and operable to float sludge that is accumulated in a lower portion of the treatment bath 300. Such a vane member 410 may include a vane body 411 and a floating wing 413.

The vane body 411 may be disposed on the lower end of the membrane support frame 600. A plurality of vane bodies may be attached in a widthwise direction of the membrane support frame 600. In the exemplary embodiment of FIG. 10, three vane bodies are mounted on the lower end of the membrane support frame 600. However, the number of the vane bodies 411 may be changed depending on the viscosity of the sludge, the amount of the sludge, etc.

For example, if the viscosity of the sludge is high and a strong vortex is required to float the sludge, or if a large amount of sludge is accumulated and a lot of floating operations is required, the number of vane bodies 411 that are attached to the lower end of the membrane support frame 600 may be increased. As the number of the vane bodies 411 is increased, the number of floating wings 413 coupled thereto is likewise increased to correspond to the number of the vane bodies.

The floating wing 413 may be connected to the lower end of the vane body 411 at a predetermined angle θ so as to float the sludge during the reciprocating motion of the membrane support frame 600. In the exemplary embodiment, the angle may be 150 degrees, but may be varied depending on a distance from the bottom of the treatment bath 300, the thickness of a sludge layer, etc. without being limited to 150 degrees.

Referring to FIG. 11, if the membrane support frame 600 reciprocates, the floating wing 413 moves in the reciprocating direction of the membrane support frame 600, thus causing a vortex in the sludge accumulated in the lower end of the treatment bath 300. Consequently, the sludge floats and filtration is performed via the separation membrane 700.

Second Exemplary Embodiment

Figure 12:
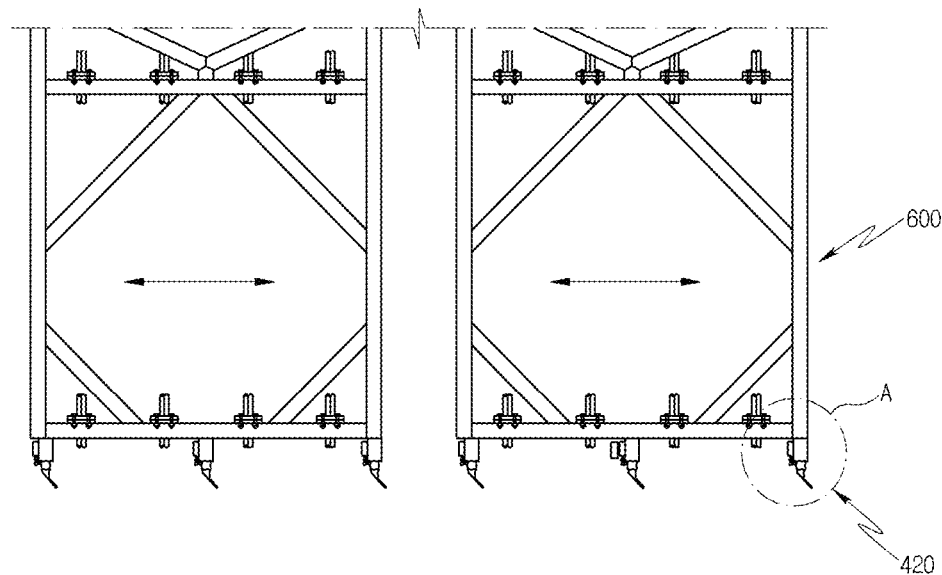
FIG. 12 is a side view illustrating an exemplary sludge floating part.
Figure 14:
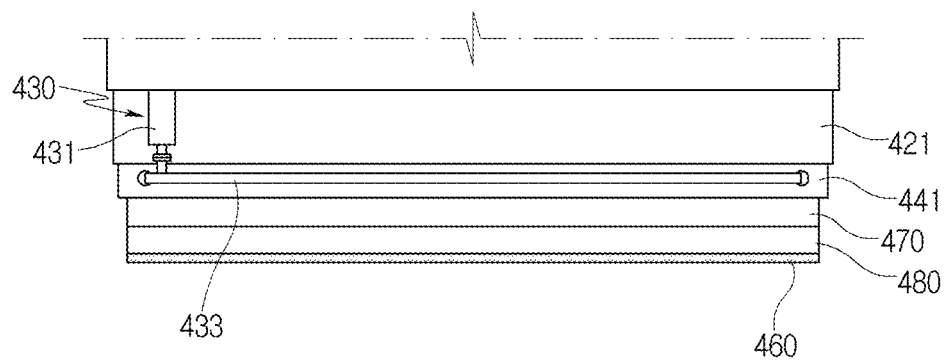
FIG. 14 is a rear view illustrating the exemplary sludge floating part of FIG. 12.
Figure 15:
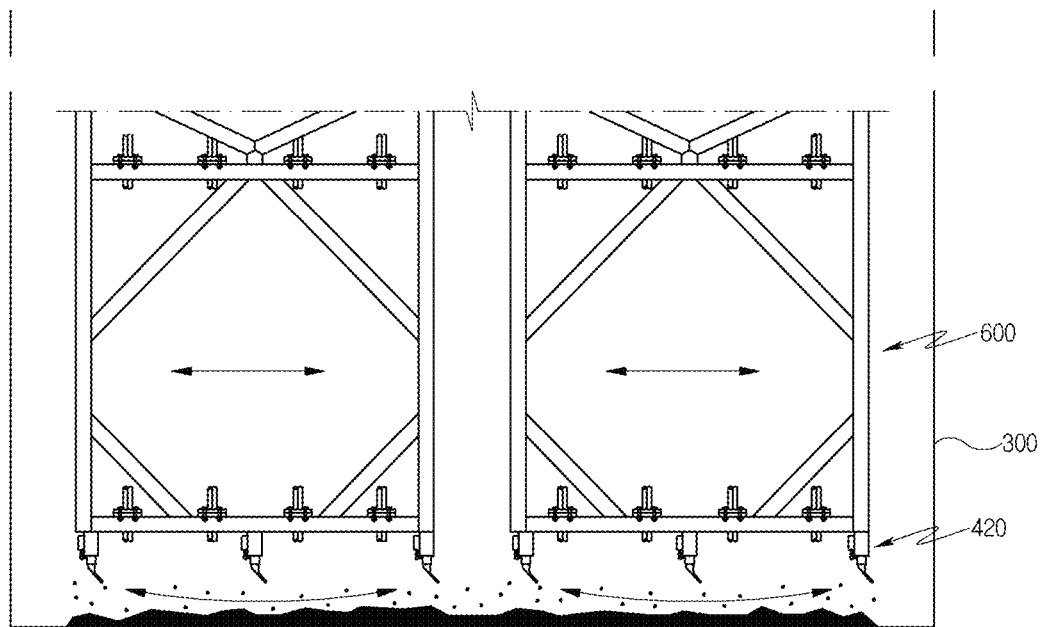
FIG. 15 is a view illustrating an exemplary operating state of FIG. 12.

According to a second exemplary embodiment, the sludge floating part 400 may be composed of a sludge floating part 420 and will be described with reference to FIGS. 12 to 15. FIG. 12 is a side view illustrating a sludge floating part according to an exemplary embodiment, FIG. 13 is a side sectional view illustrating the exemplary sludge floating part of FIG. 12, FIG. 14 is a rear view illustrating the exemplary sludge floating part of FIG. 12, and FIG. 15 is a view illustrating an exemplary operating state of FIG. 12.

Figure 13:
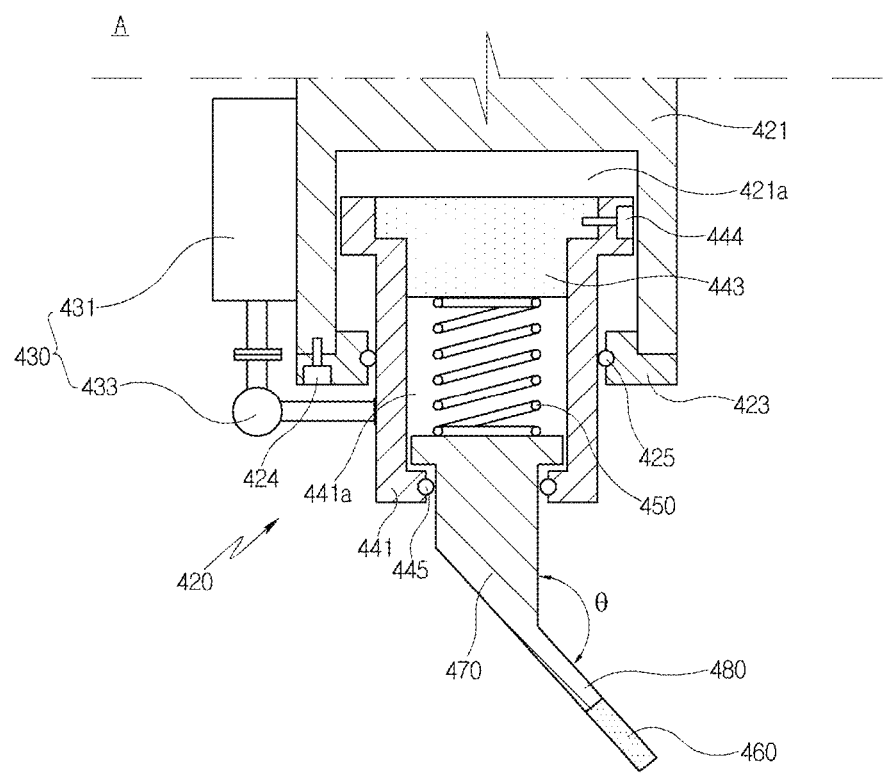
FIG. 13 is a side sectional view illustrating the exemplary sludge floating part of FIG. 12.

As shown in FIG. 13, the sludge floating part 420 may be stretchably disposed on the lower end of the membrane support frame 600 to float sludge that is accumulated in a lower portion of the treatment bath 300. Such a sludge floating part 420 may include a first vane body 421, a second vane body 441, a third vane body 470, an elevating unit 430, a floating wing 480, an elastic body 450, and a shock absorbing pad 460.

The first vane body 421 may be disposed on the lower end of the membrane support frame 600. Further, the second vane body 441 may be connected to a lower end of the first vane body 421. Specifically, a first space 421a is formed in the first vane body 421 and a part of the second vane body 441 is disposed in the first space 421a and is configured to move up and down. In this regard, a first cover 423 may be fixed by fastening a bolt 424 and a first sealing pad 425 may be disposed between an inner surface of the first cover 423 and an outer surface of the second vane body 441 to be in close contact therewith, thus preventing the inflow of fluid into the first space 421a.

The elevating unit 430 may be disposed between the first vane body 421 and the second vane body 441 to be operated in conjunction therewith and provided to move the second vane body 441 up and down. Such an elevating unit 430 may include a hydraulic cylinder 431 and an elevating rod 433. The hydraulic cylinder 431 may be fixed to a surface of the first vane body 421 by bolting or by welding. Further, the elevating rod 433 may be connected to a rod of the hydraulic cylinder 431 by bolting or by welding. Referring to FIGS. 13 and 14, the elevating rod 433 is mounted in a longitudinal direction of the second vane body 441.

When the hydraulic cylinder 431 is actuated, the elevating rod 433 moves up and down to adjust a vertical position of the floating wing 480. Thus, a proper position may be selected where the sludge accumulated in a bottom of the treatment bath 300 may be effectively floated while the floating wing 480 does not collide with the bottom of the treatment bath 300.

The third vane body 470 is connected to the lower end of the second vane body 441. Specifically, as shown in FIG. 13, a part of the third vane body 470 is disposed in a second space 441a formed in the second vane body 441 to be movable up and down, and a second sealing pad 455 may be disposed between the inner surface of the second vane body 441 and the outer surface of the third vane body 470 so as to prevent the inflow of fluid into the second space 441a.

The floating wing 480 may be connected to the lower end of the third vane body 470 so as to float the sludge during the reciprocating motion of the membrane support frame 600. Further, such a floating wing 480 may be disposed to form a predetermined angle θ with the third vane body 470. In the exemplary embodiment, the angle may be 150 degrees but may be varied depending on a distance from the bottom of the treatment bath 300, the thickness of a sludge layer, etc. without being limited to 150 degrees.

Further, the elastic body 450 may be disposed between the second vane body 441 and the third vane body 470 to absorb shocks generated when the floating wing 480 collides with the bottom of the treatment bath 300. Specifically, the elastic body 450 is disposed in the second space 441a of the second vane body 441, and a second cover 443 is placed and fixed with fastening a bolt 444. A lower side of the elastic body 450 comes into contact with an upper side of the third vane body 470. If the floating wing 480 comes into contact with the bottom of the treatment bath 300, the floating wing 480 creates an upward impact force due to the collision. At this time, the elastic body 450 absorbs the upward motion of the third vane body 470, thus mitigating the impact force.

In order to further mitigate shocks generated when the floating wing 480 collides with the bottom of the treatment bath 300, the shock absorbing pad 460 may be disposed on an end of the floating wing 480. Such a shock absorbing pad 460 may be made of elastic materials, such as rubber, silicone, or plastics.

The function of the shock absorbing pad 460 is as follows. Before the floating wing 480 collides with the bottom of the treatment bath 300, the shock absorbing pad 460 is first impacted and is bent by elastic force, thus first cancelling the impact force applied to the floating wing 480. That is, when the floating wing 480 collides with the bottom of the treatment bath 300, the shock absorbing pad 460 primarily absorbs shocks by the elastic material, and secondarily absorbs shocks as the elastic body 450 moves the third vane body 470 up and down. This eventually prevents the floating wing 480 from being damaged.

FIG. 15 illustrates the exemplary operating state of the sludge floating part 420. Referring to FIG. 15, while the membrane support frame 600 reciprocates, the sludge floating part 420 mounted on the lower end of the membrane support frame 600 also reciprocates, thus causing a vortex and floating the sludge. In this case, even if the floating wing 480 excessively approaches the bottom of the treatment bath 300, the shock absorbing pad 460 primarily mitigates shocks, and the impact force transmitted to the third vane body 470 by the floating wing 480 is secondarily mitigated by the elastic body 450, thus preventing damage during operation.

The separation membrane module 700 may be selected from a group including a spiral wound type, a tubular type, a hollow fiber type, and a plate and frame type. Especially in the hollow fiber type, the hollow fiber has a diameter ranging from 0.2 to 2 mm and is in the form of a tube that is hollow in the center. Thus, a membrane area ratio per unit volume of the hollow fiber is very high as compared to other types, so that it is possible to attain high productivity. Consequently, in an exemplary embodiment, the separation membrane module 700 is composed of the hollow fiber membrane.

The hollow fiber separation membrane may employ a pressurization method in which filtration is performed from an inside to an outside of the hollow fiber membrane, and a suction method performed in an opposite direction. Further, a method of using the hollow fiber membrane in an activated sludge process used to treat wastewater and sewage is classified into an external type where circulation is performed outside, and a submerged type where a module is directly submerged in a reactor. This embodiment will be described with reference to the method of pumping filtered water from the outside to the inside of the separation membrane module 700, and the method of directly submerging the separation membrane module 700 in the treatment bath 300.

An exemplary embodiment of the separation membrane module 700 will be described in detail with reference to FIG. 22. The separation membrane module 700 includes an upper frame 710 and a lower frame 720. A plurality of hollow fiber membranes 730 in the form of the bundle may be fixedly installed between the upper frame 710 and the lower frame 720.

The upper frame 710 and the lower frame 720 are formed to be symmetric with respect to each other while having the same shape. However, the frames may be formed in various shapes. According to this exemplary embodiment, each of the upper frame 710 and the lower frame 720 has the shape of an elongated rectangle.

The hollow fiber membrane 730 is fixed at both ends thereof to the upper frame 710 and the lower frame 720. The hollow fiber membrane 730 may be fitted such that a hollow portion of the hollow fiber membrane 730 communicates with a sump 711 that is formed to define a space in the upper frame 710. Thus, the filtered water that is filtered while being pumped from the outside to the inside of the hollow fiber membrane may be collected in the sump 711. This will be described in detail in the following description of the filtered-water discharge part.

In the above-described exemplary embodiment, both ends of the hollow fiber membrane 730 are fixed to the upper frame 710 and the lower frame 720. However, according to another exemplary embodiment, the hollow fiber membrane may be installed between the upper frame and the lower frame, but the hollow fiber membrane may be wound in a U-shape via a fixing bar (not shown) provided on the lower frame while both ends of the hollow fiber membrane may be fixed to the upper frame. For example, the fixing bar may be a bar having a space through which the hollow fiber membrane may pass.

The hollow fiber membranes 730 are closely formed like a curtain in the longitudinal direction of the frame. Moreover, the hollow fiber membranes may be formed in bundles at regular lengths such that the bundles are spaced apart from each other by a predetermined distance. This gives a slight separation distance to allow water to be circulated well, because water stays and fouling becomes severe if the separation membranes are too closely arranged in the longitudinal direction.

A plurality of separation membrane modules 700 configured as described above may be disposed in the membrane support frame 600. If there is no interval or a very small interval between neighboring separation membrane modules 700, water may stay between the modules and thereby fouling may become severe. Therefore, the density of the separation membrane modules 700 should be reduced to allow water to smoothly flow between the modules.

Figure 22:
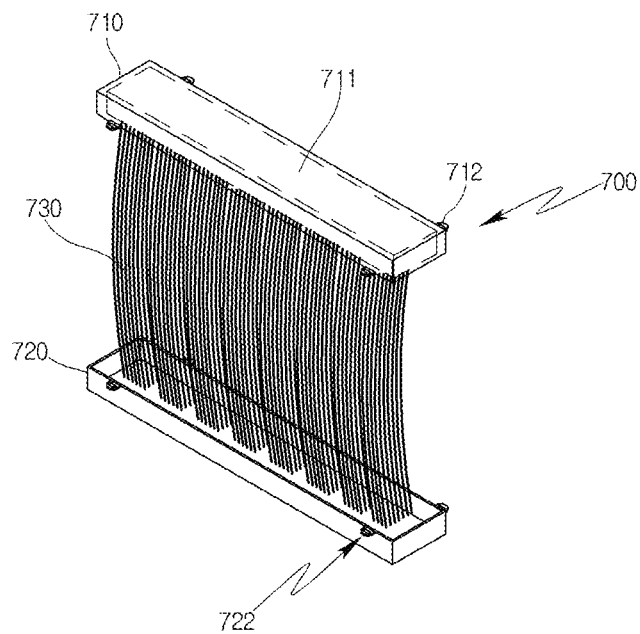
FIG. 22 is a view illustrating a structure of an exemplary separation membrane module of FIG. 1.

As shown in FIG. 22, in order to keep the interval between the separation membrane modules 700 constant, an interval maintaining part may be further formed on each of the upper frame 710 and the lower frame 720. Specifically, one or more interval maintaining parts 712 may be formed on both sides of the upper frame 710 to protrude by a predetermined length, and one or more interval maintaining parts 722 may be likewise formed on both sides of the lower frame 720 to protrude out. In one exemplary embodiment, the upper frame interval maintaining part 712 and the lower frame interval maintaining part 722 are formed at the same position to be symmetric with respect to each other. The interval maintaining part may be formed integrally with the upper frame or the lower frame structure or formed separately from the upper frame or the lower frame structure and then coupled thereto.

According to this exemplary embodiment, two interval maintaining parts 712 and 722 are formed on both sides of the upper frame 710 and the lower frame 720, and are located at both ends in the frame longitudinal direction. Further, the interval maintaining parts 712 and 722 protrude from the upper frame 710 and the lower frame 720 by approximately 1 cm. Thus, when the plurality of separation membrane modules 700 is arranged, the interval maintaining parts of the facing separation membrane modules 700 butt against each other. Consequently, the interval between the respective modules may be kept constant, namely, at about 2 cm. However, it is to be understood that the interval maintaining part may be formed to protrude from the upper frame or the lower frame by about 1 cm or more. In this case, the interval between the respective modules may be about 2 cm or more.

The interval maintaining part may not be formed on both sides of each frame but may be formed on only one side thereof. In this regard, in order to allow water to smoothly flow while preventing water from staying between the respective separation membrane modules 700, the interval between the respective modules may be 2 cm or more. However, if the interval is too large, the separation membrane modules occupy a large installation space and filtration efficiency is lowered. Thus, the interval between the respective modules may be 4 cm or less.

Further, the interval maintaining parts 712 and 722 may include a coupling part (not shown) to allow the interval maintaining part to be easily coupled with another opposite interval maintaining part. For example, the coupling part may be a magnet. An S-pole is formed on an interval maintaining part located at one side of the frame, and an N-pole is formed on an interval maintaining part located at the other side of the frame, thus allowing the plurality of separation membrane modules 700 to be coupled with each other. Thus, even if the separation membrane module 700 reciprocates, the interval between the respective modules may be firmly maintained.

The membrane support frame 600 according to an exemplary embodiment and a structure in which the plurality of separation membrane modules 700 is installed in the membrane support frame 600 will be described.

First Exemplary Embodiment

Figure 23:
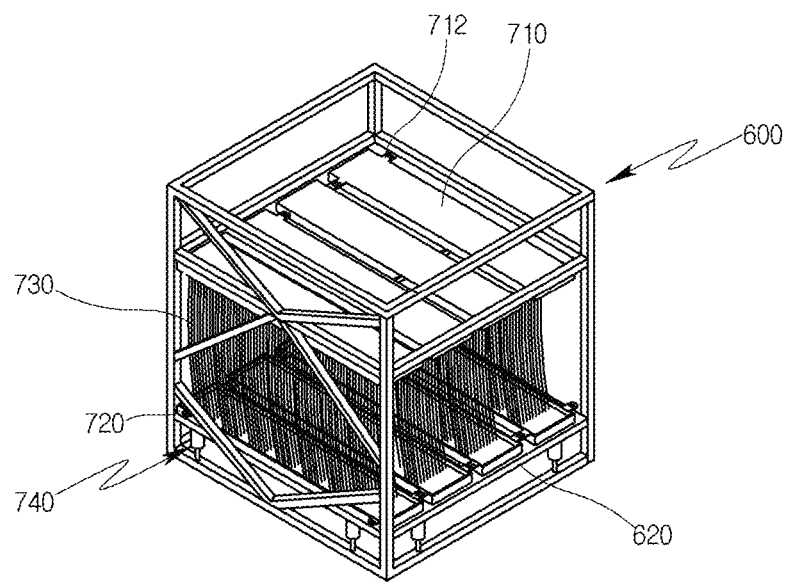
FIG. 23 is a view illustrating a first exemplary embodiment of a membrane support frame of FIG. 1.

The membrane support frame 600 according to the first exemplary embodiment and the structure of the separation membrane module 700 disposed in the membrane support frame 600 will be described with reference to FIG. 23. According to this exemplary embodiment, the membrane support frame 600 may be in the shape of a rectangular frame, and may include a subsidiary frame 620 for installing the plurality of separation membrane modules 700. The subsidiary frame 620 is provided on a lower side of the membrane support frame 600. Thus, the plurality of separation membrane modules 700 may be coupled to the subsidiary frame 620 using a bolt or by fitting the plurality of separation membrane modules 700 into a rail formed on the subsidiary frame 620. However, without being limited thereto, the separation membrane module 700 may be installed in the subsidiary frame 620 in various ways. In addition, the plurality of separation membrane modules 700 may be directly installed in the membrane support frame 600.

The subsidiary frame 620 may be formed as a rectangular plate to correspond to a lower surface of the membrane support frame 600. Alternatively, the subsidiary frame may be formed in the shape of a plurality of rods that are formed in parallel on a lower portion of the membrane support frame 600 in a direction where the plurality of separation membrane modules 700 is arranged in the membrane support frame 600.

The plurality of separation membrane modules 700 may be installed in parallel in the membrane support frame 600, namely, on the subsidiary frame 620. According to this exemplary embodiment, since each separation membrane module 700 is formed in the shape of an elongated rectangle, the entire installation structure of the separation membrane modules 700 has a square or rectangular shape, as illustrated in FIG. 23.

A plurality of membrane support frames 600 is arranged in the treatment bath 300. Since the entire installation structure of the separation membrane modules 700 is formed in the rectangular shape as such, it is possible to closely arrange the separation membrane modules 700. Thus, it is possible to minimize a dead zone and thereby improve filtration capacity. However, without being limited thereto, the installation structure of the separation membrane modules may be formed in various shapes. Further, since interval maintaining parts 712 and 722 are formed on each of the upper frame 710 and the lower frame 720 of the separation membrane modules, it is possible to keep the interval between the separation membrane modules 700 constant when the plurality of separation membrane modules 700 is arranged in parallel.

Second Exemplary Embodiment

The membrane support frame 600 according to the second exemplary embodiment and the structure of the separation membrane module 700 disposed in the membrane support frame 600 will be described with reference to FIG. 24.

According to this exemplary embodiment, the membrane support frame 600 is formed in the shape of a rectangular frame, and further includes a filtration pipe 640 formed on an upper side of the membrane support frame 600. Specifically, the filtration pipe 640 is installed to cross a central region of an upper surface of the membrane support frame 600.

Further, as in the first exemplary embodiment, a subsidiary frame 620 may be included to install the plurality of separation membrane modules 700. In general, the subsidiary frame 620 is provided on a lower side of the membrane support frame 600.

Coupling holes 642 are formed on both sides of the filtration pipe 640 to cause the plurality of separation membrane modules 700 to be coupled thereto. Each upper frame 710 of the separation membrane module is coupled to each coupling hole 642 so that the sump 711 defined in the upper frame 710 and the filtration pipe 640 communicates with each other. That is, according to this exemplary embodiment, the filtration pipe 640 is arranged to be perpendicular to a direction in which the reciprocating frame 250 reciprocates, and the plurality of separation membrane modules 700 is symmetrically coupled to both sides of the filtration pipe 640.

Since the plurality of membrane support frames 600 is successively arranged in the direction in which the reciprocating frame 250 reciprocates, the filtration pipe 640 is more preferably arranged as in this exemplary embodiment rather than being arranged in parallel to the reciprocating direction. This arrangement is convenient to secure an installation space of the filtered-water discharge part 900. Thus, the filtered water collected in the respective sumps 711 of the plurality of separation membrane modules 700 may be gathered in the filtration pipe 640. This will be described below in detail. Further, each lower frame 720 of the separation membrane module 700 may be coupled to the subsidiary frame 620 using a bolt or by fitting the plurality of separation membrane modules 700 into a rail formed on the subsidiary frame 620. However, the invention is not limited thereto and the separation membrane modules 700 may be installed on the subsidiary frame 620 in various ways. In addition, the plurality of separation membrane modules 700 may be directly installed in the membrane support frame 600.

Figure 24:
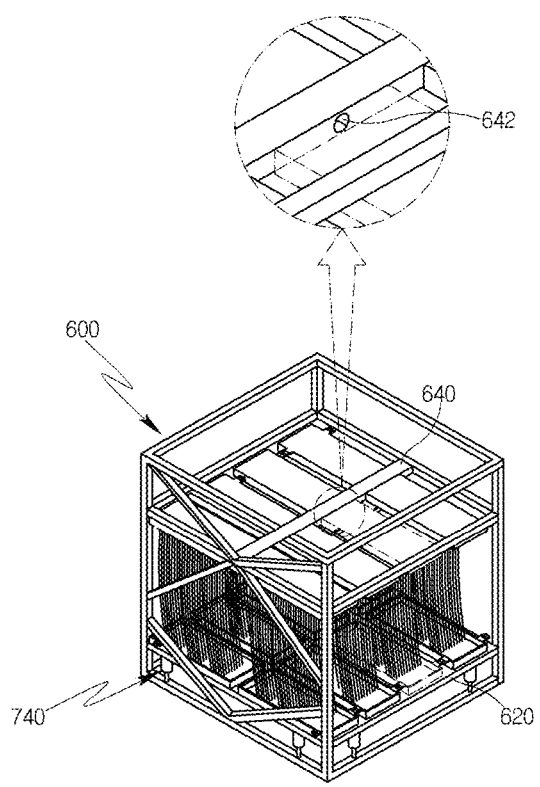
FIG. 24 is a view illustrating a second exemplary embodiment of a membrane support frame.

According to this exemplary embodiment, the entire installation structure of the separation membrane modules that are coupled to each other has a rectangular shape as illustrated in FIG. 24. Similarly to the first exemplary embodiment, it is possible to closely arrange the separation membrane modules 700, thus minimizing the dead zone and improving the filtration capacity. Further, since the interval maintaining parts 712 and 722 are formed on the upper and lower frames 710 and 720 of the separation membrane module, it is possible to keep the interval between the modules constant when the plurality of separation membrane modules 700 is arranged in parallel.

In the above description of the installation exemplary structure of the separation membrane module, a constant interval is maintained between the respective separation membrane modules 700 by the interval maintaining parts 712 and 722 formed on both sides of the separation membrane modules. However, separation membrane modules each having the interval maintaining part on only one side of the frame, in other words, two separation membrane modules each having the interval maintaining part on a left side or a right side may be grouped into one set, so that a constant interval may be maintained per two separation membrane modules. Further, three separation membrane modules may be grouped into one set, so that a constant interval may be maintained per three modules. Thus, it is possible to more closely arrange the separation membranes while preventing water from staying between the separation membrane modules, thus improving the filtration capacity.

As the separation membrane module 700 is reciprocated by the reciprocating part 200, inertial force acting on the separation membrane module 700 is generated, thus preventing contaminants from being attached to a surface of the separation membrane or removing the contaminant from the surface of the separation membrane. In order to maximize the effect of preventing the attachment of foreign matter or removing the foreign matter on the separation membrane due to the inertial force, the looseness of the separation membrane should be maintained to a proper level. It is difficult to impart the inertial force and the separation membrane module 700 may become broken or damaged even if the separation membrane module 700 is integrally reciprocated by the reciprocating motion of the membrane support frame 600 if there is no looseness of the separation membrane module 700. Also, it is likewise difficult to impart the inertial force when the reciprocating distance of the separation membrane module 700 is increased, thus occupying a lot of installation space, if the looseness of the separation membrane module is too large.

Accordingly, the length of the hollow fiber membrane 730 may be set by adding a distance Lo between the upper frame 710 and the lower frame 720 to a length that is more than 0% and equal to or less than 10% of the distance Lo. That is, a surplus length of 10% or less may be further provided to a maximum length (hereinafter, referred to as a 'minimum length of separation membrane') in the state where no tensile force acts on a strand of the hollow fiber membrane 730 that is connected to the upper and lower frames 710 and 720. Particularly, the surplus length may range from 5% to 10%.

Figure 25:
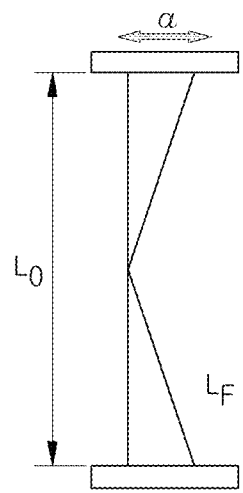
FIG. 25 is a view illustrating an exemplary method of calculating looseness.

Specifically, as illustrated in FIG. 25, a maximum length Lf of the separation membrane that may generate the inertial force on the separation membrane by the reciprocating motion may be calculated using the minimum length of the separation membrane, namely, a vertical distance Lo between the upper frame 710 and the lower frame 720, and the reciprocating distance a of the separation membrane module. The looseness of the separation membrane module 700 may be determined as a value obtained by dividing the maximum length Lf of the separation membrane by the minimum length Lo of the separation membrane. That is, the looseness of the separation membrane module 700 should be more than 1 and equal to or less than 1.1. Particularly, the looseness may be in the range from 1.05 or more to 1.1 or less.

For example, assuming that the reciprocating distance a of the separation membrane module 700 is 100 mm and the minimum length Lo of the separation membrane, namely, the vertical distance between the upper frame 710 and the lower frame 720 is 500 mm, the maximum length Lf of the separation membrane may be calculated as 538.5 mm by the properties of a triangle as illustrated in FIG. 25. The looseness is calculated to be about 1.08 (precisely, 1.077). However, if the reciprocating distance is 150 mm, the maximum length Lf of the separation membrane is equal to 583.1 mm and the looseness has a value of approximately 1.17 (precisely, 1.166). Since the looseness exceeds 1.1, the reciprocating distance a may be reduced or the minimum length of the separation membrane may be increased.

In another example, if the minimum length Lo of the separation membrane is 750 mm when the reciprocating distance of the separation membrane module 700 is 100 mm, the maximum length Lf of the separation membrane is calculated as 776.2 mm, so that the looseness corresponds to 1.03. Meanwhile, if the minimum length Lo of the separation membrane is 1000 mm, the maximum length Lf of the separation membrane is calculated as 1019.8 mm, so that the looseness approximately corresponds to 1.02.

However, if the minimum length Lo of the separation membrane is 1500 mm when the reciprocating distance of the separation membrane module 700 is 100 mm, the maximum length Lf of the separation membrane is calculated as 1513.3 mm, so that the looseness approaches 1. Thus, it becomes difficult to impart inertial force to the separation membrane. In this case, the reciprocating distance a of the separation membrane module 700 should be further increased or the minimum length Lo of the separation membrane should be reduced.

As such, when reducing or eliminating the contamination of the separation membrane by the reciprocating motion, the looseness of the separation membrane module 700 is critical. Thus, a length adjusting part 740 may be further provided to adjust the looseness of the separation membrane module 700 depending on the reciprocating distance of the membrane filtration system.

The length adjusting part 740 may be formed to adjust the minimum length of the separation membrane, namely, the length between the upper frame 710 and the lower frame 720, and to adjust the length of the separation membrane itself. This will be described in detail according to the following exemplary embodiment.

Figure 26:
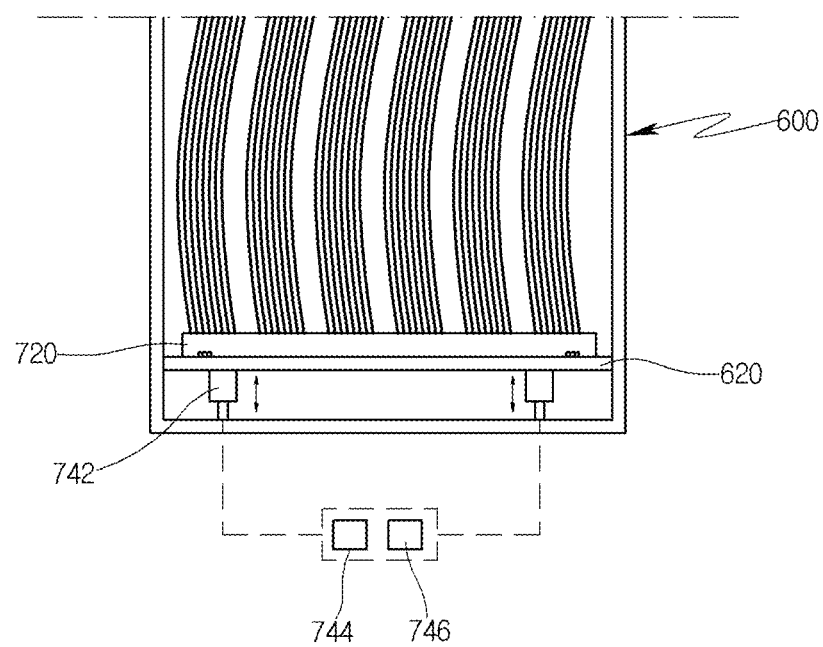
FIG. 26 is an enlarged view illustrating an exemplary length adjusting part according to a first exemplary embodiment.

The length adjusting part 740 according to a first exemplary embodiment will be described with reference to FIG. 26. The length adjusting part 740 is formed to vertically drive a side of the separation membrane module 700, namely, the subsidiary frame 620 of the membrane support frame to which the lower frame 720 is fixedly installed, so as to adjust the length between the upper frame 710 and the lower frame 720. Specifically, the length adjusting part 740 according to the first exemplary embodiment may be composed of a hydraulic cylinder 742 located under the subsidiary frame 620. The hydraulic cylinder 742 may be fixed to a bottom of the subsidiary frame 620 by fastening a bolt or by welding.

One or more hydraulic cylinders 742 may be installed to the bottom of the subsidiary frame 620. The hydraulic cylinders may be arranged at proper locations depending on their number. According to this exemplary embodiment, four hydraulic cylinders 742 are arranged at respective vertices of the rectangular subsidiary frame 620.

Thus, when the hydraulic cylinder 742 is actuated, the entire subsidiary frame 620 is moved in a vertical direction, and the lower frame 720 of the separation membrane module is integrally moved in the vertical direction, so that it is possible to adjust the minimum length of the separation membrane. That is, if the subsidiary frame 620 is moved up by driving the hydraulic cylinder 742 in the state where the length of the separation membrane is maintained, the lower frame 720 also moves up and a distance between the lower frame and the upper frame 710 is decreased. Thus, the minimum length of the separation membrane is reduced and thereby the looseness of the separation membrane module 700 is increased. In contrast, if the subsidiary frame 620 is moved down by driving the hydraulic cylinder 742, the lower frame 720 also moves down and a distance between the lower frame and the upper frame 710 is increased. Thus, the minimum length of the separation membrane is increased and thereby the looseness of the separation membrane module 700 is decreased.

Although the hydraulic cylinder 742 may be operated manually, the operation of the hydraulic cylinder may be automatically controlled by further including a calculation part 744 and a drive part 746. The calculation part calculates a vertical movement amount of the subsidiary frame 620 by calculating the length of the minimum separation membrane that is suitable for the looseness of the separation membrane depending on the reciprocating distance or the reciprocating period of the separation membrane. The drive part transmits the calculated vertical movement amount to the hydraulic cylinder 742 to drive the hydraulic cylinder.

Figure 27:
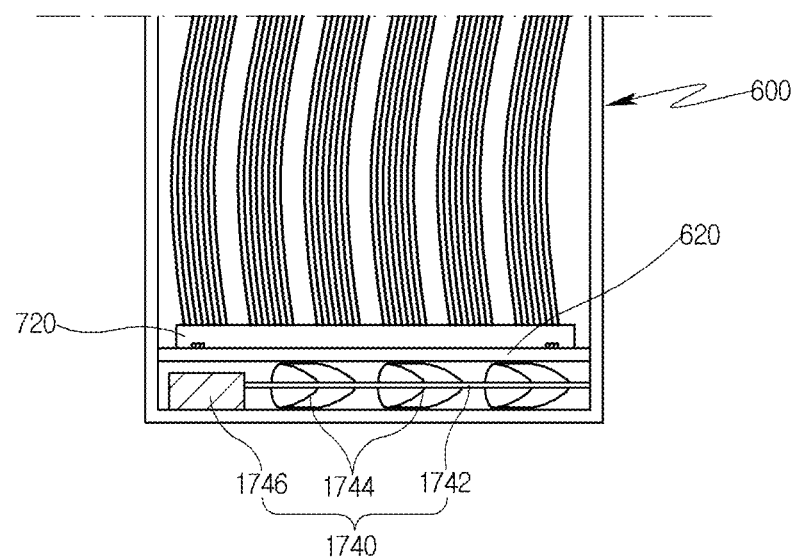
FIG. 27 is an enlarged view illustrating an exemplary length adjusting part according to a second exemplary embodiment.

A length adjusting part 1740 according to a second exemplary embodiment will be described with reference to FIG. 27. Similar to the first exemplary embodiment, the length adjusting part 1740 is formed to vertically drive a side of the separation membrane module 700, namely, the subsidiary frame 620 of the membrane support frame to which the lower frame 720 is fixedly installed, so as to adjust the length between the upper frame 710 and the lower frame 720. Specifically, the length adjusting part 1740 according to the second exemplary embodiment includes a shaft 1742 installed under the subsidiary frame 620, one or more cams 1744 that are coupled to the shaft 1742 to be rotatable integrally with the shaft, and a motor 1746 for rotating the shaft 1742.

A plurality of shafts 1742 may be installed in parallel under the subsidiary frame 620. According to this exemplary embodiment, two shafts are formed in parallel along an edge of the subsidiary frame 620 to face each other. One or more cams 1744 are coupled to each shaft to be integrally rotatable as the shaft 1742 rotates. As the cam 1744 rotates, the radius length of the cam is changed to adjust the height of the lower frame 620.

Although the motor 1746 may be operated manually, its operation may be automatically performed by further including a calculation part 744 and a drive part 746, as in the first exemplary embodiment. The calculation part calculates a vertical movement amount of the subsidiary frame 620. The drive part transmits the calculated vertical movement amount to the motor 1746 to control the rotation of the shaft 1742.

Although not shown in the drawings, according to another exemplary embodiment, a length adjusting part may be formed to adjust the length of the separation membrane itself. Specifically, an unwinding part is formed to wind or unwind one end of the separation membrane module, namely, one end of the hollow fiber membrane, thus adjusting the entire length of the separation membrane module by winding or unwinding one end of the separation membrane.

Another exemplary embodiment may further include an interval measuring unit 810 and an interval adjusting part 820. This will be described below in detail.

First Exemplary Embodiment

Figure 16A:
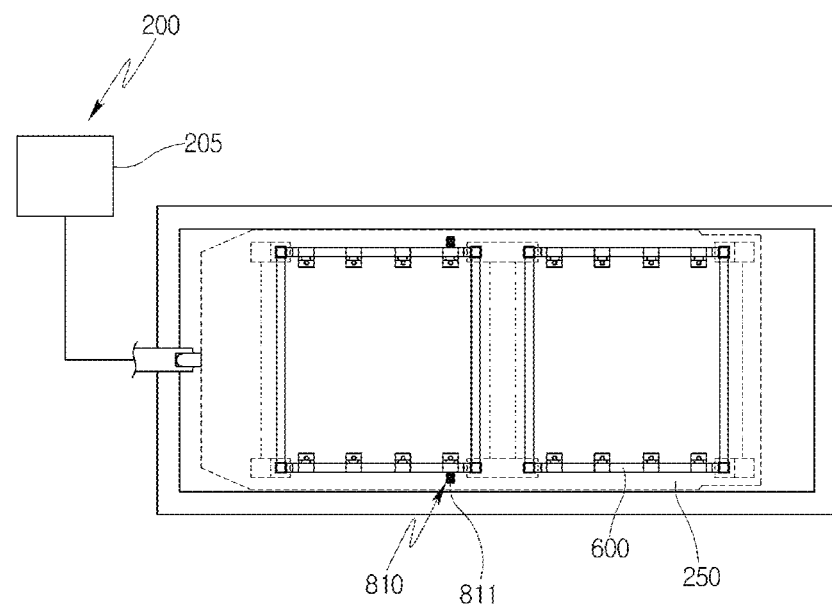
FIGS. 16A and 16B are views illustrating an exemplary embodiment of an interval measuring unit.
Figure 16B:
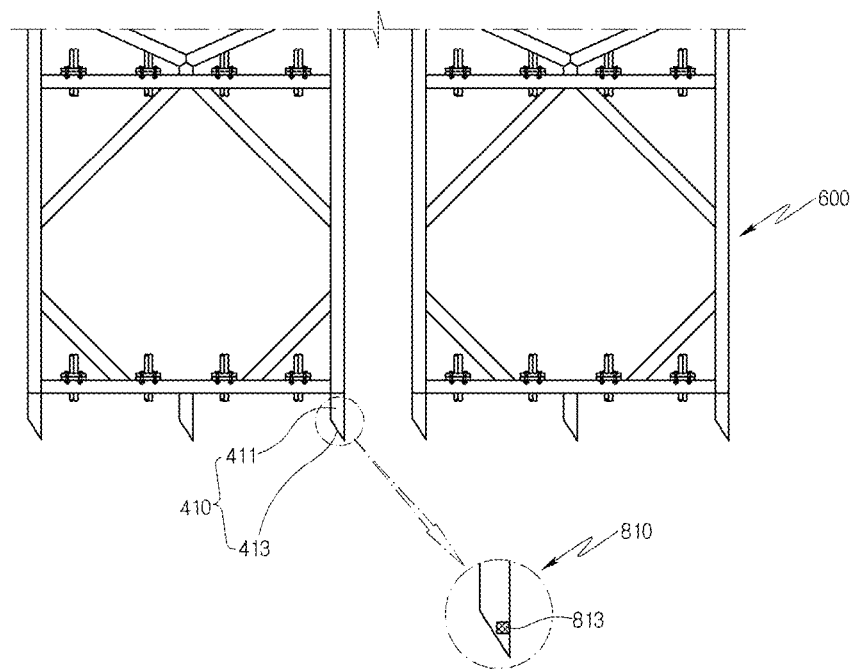

FIGS. 16A and 16B are views illustrating an exemplary embodiment of an interval measuring unit. Referring to FIGS. 16A and 16B, the interval measuring unit 810 of the exemplary embodiment may be provided to measure the interval between the membrane support frame 600 or the vane member 410 and the treatment bath 300.

Such an interval measuring unit 810 may include a first interval measuring sensor 811 and a second interval measuring sensor 813. The first interval measuring sensor 811 may be a sensor to measure the interval between the membrane support frame 600 and an inner wall of the treatment bath 300, and the second interval measuring sensor 813 may be a sensor to measure the interval between the vane member 410 and the bottom of the treatment bath 300.

Referring to FIG. 16A, a pair of first interval measuring sensors 811 is disposed on both sides of the membrane support frame 600, thus measuring the interval between the membrane support frame 600 and the inner wall of the treatment bath 300. If an interval measured by the sensor provided on one side is relatively narrower than an interval measured by the sensor provided on the other side or is smaller than a preset permissible interval, the first interval measuring sensor 811 gives a signal to a controller. At this time, after the drive part 205 of the reciprocating part 200 is stopped, a horizontal position of the membrane support frame 600 connected to the reciprocating frame 250 by fastening a bolt or the like is reset, thus preventing a collision between the membrane support frame 600 and the inner wall of the treatment bath 300.

It cans be seen in FIG. 16B that the second interval measuring sensor 813 is disposed on a portion of the floating wing 413 of the vane member 410. As the membrane support frame 600 reciprocates, the vane member 410 also reciprocates. A vertical position of the floating wing 413 may become changed by vibration, shaking or the like.

At this time, the second interval measuring sensor 813 measures the interval from the bottom of the treatment bath 300. If the measured interval is smaller than a preset permissible interval, a signal is transmitted to the controller and the drive part 205 of the reciprocating part 200 is stopped. Subsequently, the vertical position of the membrane support frame 600 connected to the reciprocating frame 250 by fastening a bolt or the like is reset, thus preventing the floating wing from colliding with the bottom of the treatment bath 300.

Second Exemplary Embodiment

Figure 17:
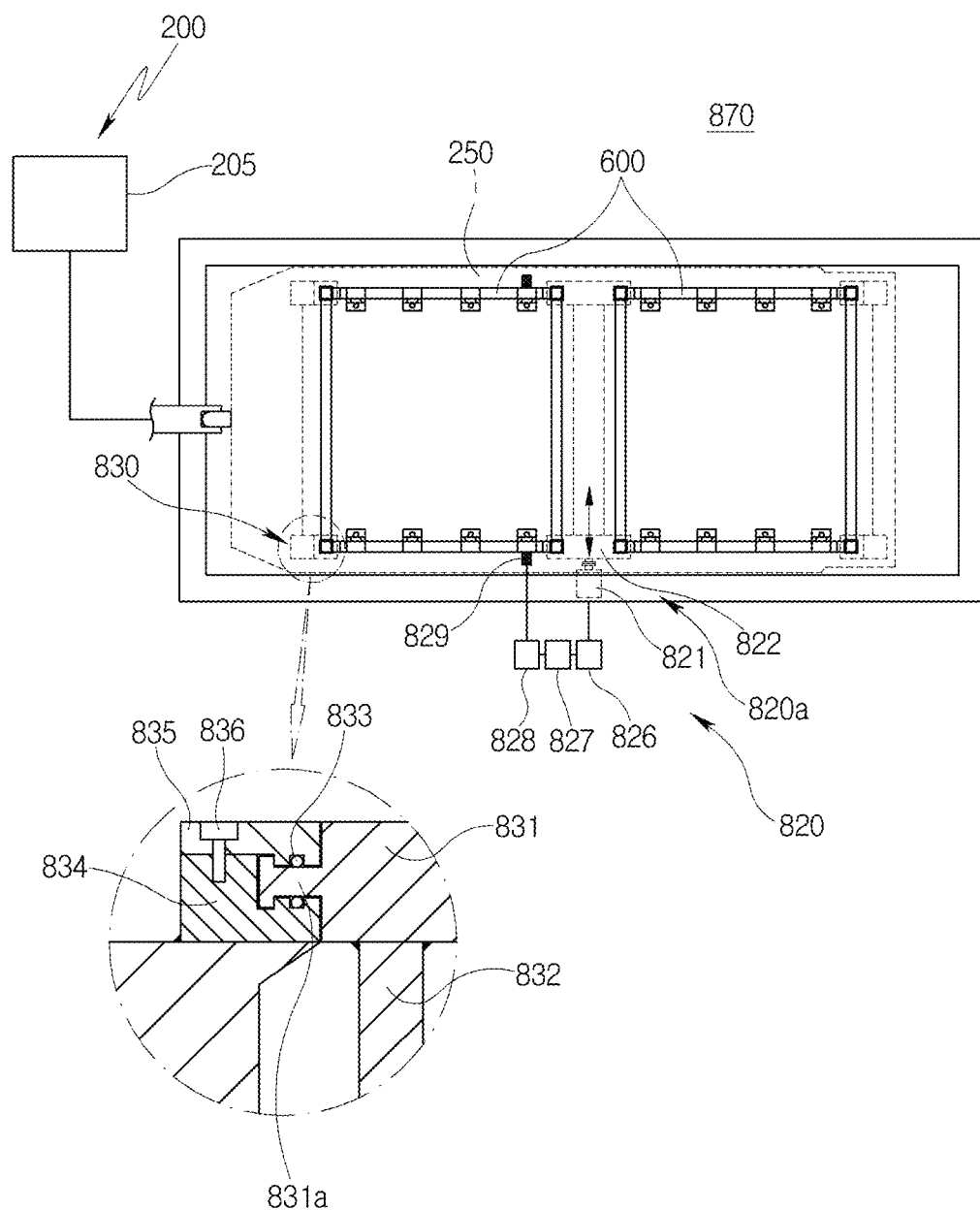
FIG. 17 is a top view illustrating an exemplary embodiment of an interval adjusting part.
Figure 18:
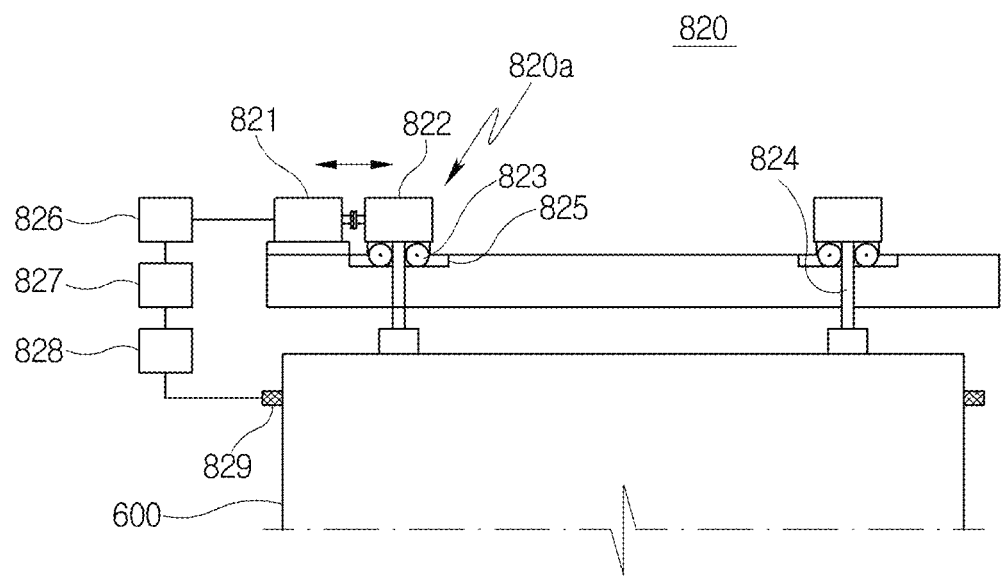
FIG. 18 is a partial side view of an exemplary first interval adjusting part of FIG. 17.
Figure 19:
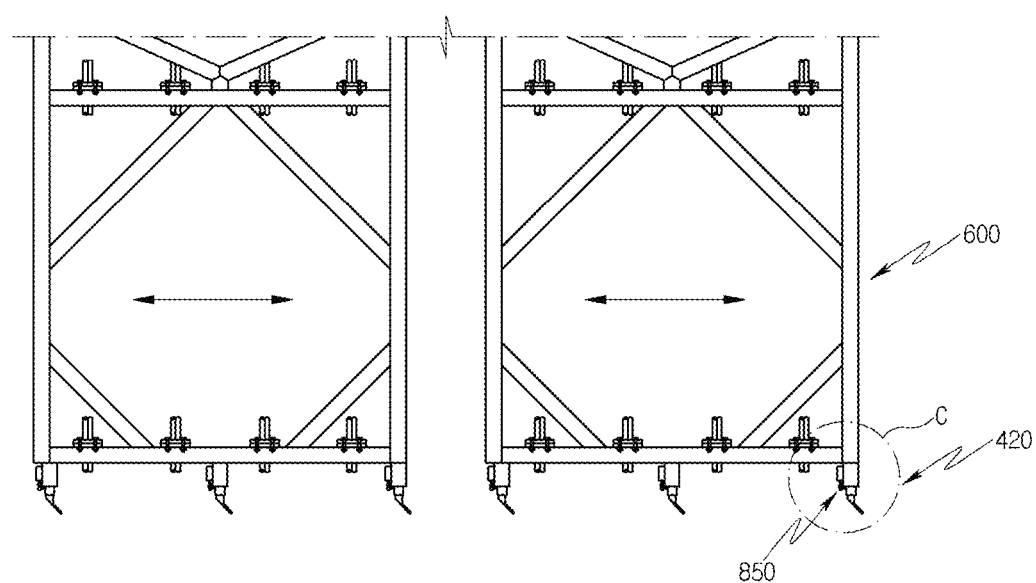
FIG. 19 is a side view illustrating an exemplary second interval adjusting part of FIG. 17.
Figure 20:
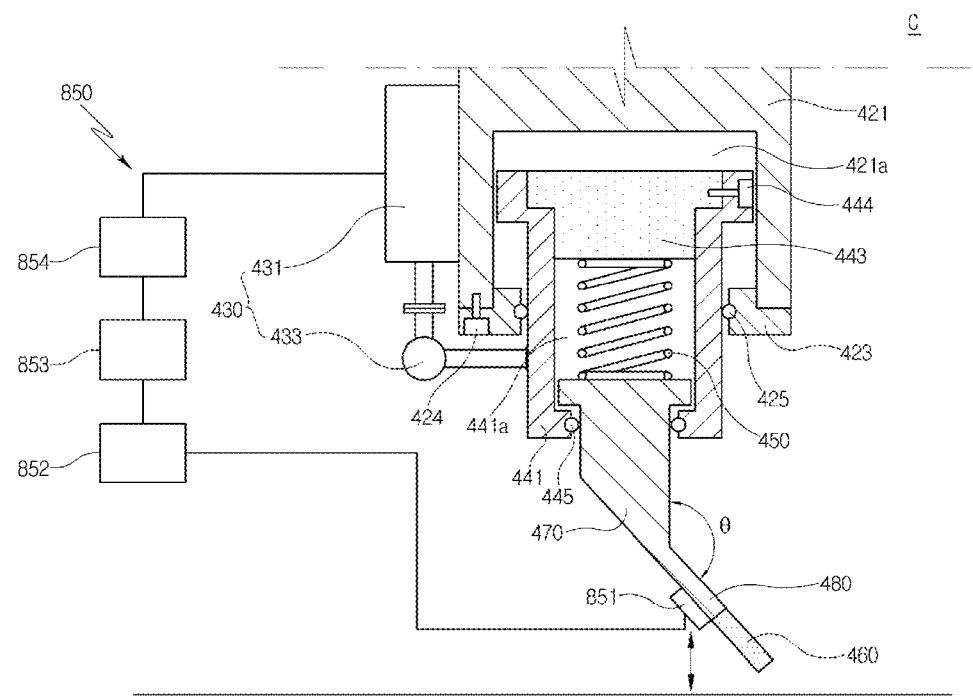
FIG. 20 is a side sectional view illustrating an exemplary interlocking operation of the sludge floating part and the second interval adjusting part of FIG. 19.
Figure 21:
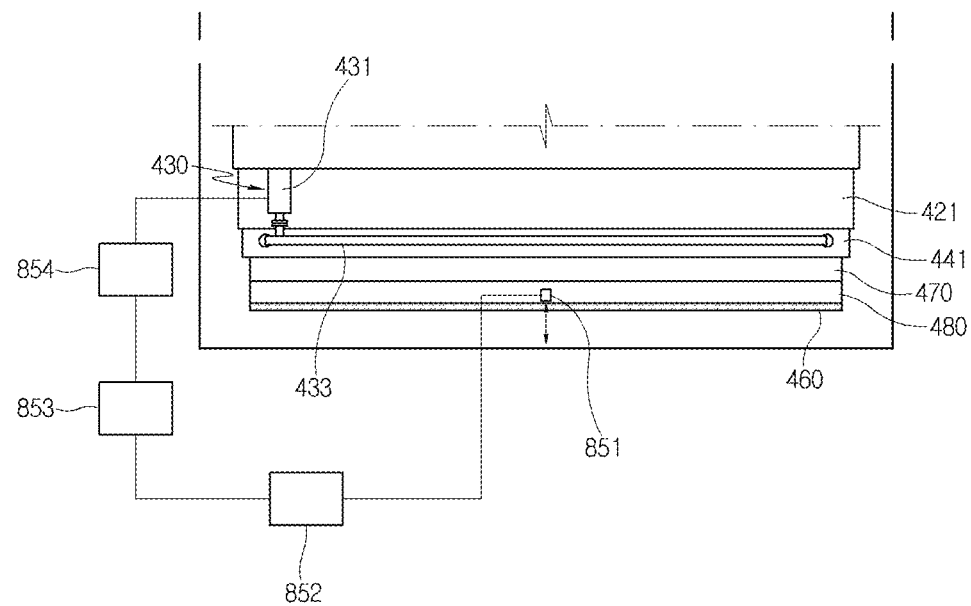
FIG. 21 is a rear view illustrating the exemplary interlocking operation of the sludge floating part and the second interval adjusting part of FIG. 20.

FIG. 17 is a top view illustrating an exemplary embodiment of an interval adjusting unit, FIG. 18 is a partial side view of a first interval adjusting part of the exemplary embodiment shown in FIG. 17, FIG. 19 is a side view illustrating a second interval adjusting part of the exemplary embodiment shown in FIG. 17, FIG. 20 is a side sectional view illustrating an interlocking operation of the sludge floating part and the second interval adjusting part of the exemplary embodiment shown in FIG. 19, and FIG. 21 is a rear view illustrating the interlocking operation of the sludge floating part and the second interval adjusting part of the exemplary embodiment shown in FIG. 20.

Referring to FIGS. 17 to 21, the interval adjusting unit 870 of the exemplary embodiment may be provided to adjust the interval between the membrane support frame 600 or the sludge floating part 420 and the treatment bath 300. Such an interval adjusting unit 870 may include a first interval adjusting part 820 that adjusts an interval between the membrane support frame 600 and the inner wall of the treatment bath 300, and a second interval adjusting part 850 that adjusts an interval between the sludge floating part 420 and the bottom of the treatment bath 300.

First, the first interval adjusting part 820 may include an adjustment cylinder 821, a moving unit 820a, a first proximity sensor 829, a first interval calculating part 828, a first hydraulic-pressure calculating part 827, and a first drive part 826. Referring to FIG. 17, according to the exemplary embodiment, two membrane support frames 600 are connected to the reciprocating frame 250, and the adjustment cylinder 821 may be disposed on the upper end of the reciprocating frame 250 between the pair of membrane support frames 600.

The moving unit 820a may be connected to a rod of the adjustment cylinder 821, may support the membrane support frame 600, and may be disposed to be movable in a widthwise direction of the reciprocating frame 250. As shown in FIGS. 17 and 18, such a moving unit 820a may include a moving rail 825 and a moving block 822. Referring to FIG. 18, the moving rail 825 may be disposed in the widthwise direction of the reciprocating frame 250, and the moving block 822 may be provided with a moving wheel 823 to move along the moving rail 825 and may be connected with the membrane support frame 600 via a support beam 824.

The first proximity sensor 829 may be disposed on a side of the membrane support frame 600. The first interval calculating part 828 may be provided to measure an interval between the membrane support frame 600 and the inner wall of the treatment bath 300 in response to a signal delivered from the first proximity sensor 829.

The first hydraulic-pressure calculating part 827 converts a calculated value of the first interval calculating part 828 into a hydraulic drive value to gives a signal to the first drive part 826. The first drive part 826 may be provided to drive the adjustment cylinder 821 according to the hydraulic drive value of the first hydraulic-pressure calculating part 827.

For example, if the interval between the inner wall of the treatment bath 300 and the membrane support frame 600 does not reach a preset permissible interval, the first proximity sensor 829 sends information to the first interval calculating part 828 and the first interval calculating part 828 calculates the interval. Thereafter, if this information is sent to the first hydraulic-pressure calculating part 827, the first hydraulic-pressure calculating part 827 calculates a required hydraulic drive value. Information obtained after the calculation is sent to the first drive part 826, and the adjustment cylinder 821 moves the moving block 822 forwards or backwards as desired. Thus, the moving block 822 moves along the moving rail 825 to adjust the position of the membrane support frame 600.

A side block 830 is disposed on the reciprocating frame 250, thus helping to support the membrane support frame 600. Referring to FIG. 17, a first side block 831 is disposed on four edges of the reciprocating frame 250 and is likewise connected to the membrane support frame 600 via the support beam 832 for support.

Here, a projection 831a of the first side block 831 may come into contact with a linear bearing 833 to smoothly perform a rectilinear motion on the second side block 834. A user may fix a cover 835 by tightening a bolt 836. Four side blocks are disposed on the reciprocating frame 250, and support the widthwise movement of the membrane support frame 600 by the adjustment cylinder 821.

The second interval adjusting part 850 may include a second proximity sensor 851, a second interval calculating part 852, a second hydraulic-pressure calculating part 853, and a second drive part 854. The second proximity sensor 851 may be disposed on the floating wing 480 to measure the interval between the floating wing 480 and the bottom of the treatment bath 300. The second interval calculating part 852 may be provided to calculate the interval between the floating wing 480 and the bottom of the treatment bath 300 in response to a signal delivered from the second proximity sensor 851. The second hydraulic-pressure calculating part 853 may be provided to convert the calculated value of the second interval calculating part 852 into the hydraulic drive value. The second drive part 854 may be provided to drive the hydraulic cylinder 431 according to the hydraulic drive value of the second hydraulic-pressure calculating part 853.

For example, if the second proximity sensor 851 measures the interval between the floating wing 480 and the bottom of the treatment bath 300 and the interval does not reach a preset permissible interval, a signal is transmitted to the second interval calculating part 852. The second interval calculating part 852 calculates the interval between the floating wing 480 and the bottom of the treatment bath 300 in response to the signal delivered from the second proximity sensor 851 and delivers the value to the second hydraulic-pressure calculating part 853. The second hydraulic-pressure calculating part 853 converts the calculated interval into the hydraulic drive value and transmits a signal to the second drive part 854.

Accordingly, the second drive part 854 drives the hydraulic cylinder 431 to adjust the vertical position of the second vane body 441. If the second vane body 441 moves up, the third vane body 470 and the floating wing 480 connected to the lower end of the third vane body 470 also move upwards, thus adjusting the interval.

According to the exemplary embodiments, the first interval adjusting part 820 and the second interval adjusting part 850 calculate the interval between the membrane support frame 600 or the sludge floating part 420 and the treatment bath 300, and automatically readjust the interval when the calculated interval does not reach a preset permissible interval, thus preventing a reduction in equipment operational efficiency and a damage to equipment due to a collision of equipment.

Hereinafter, exemplary embodiments of the filtered-water discharge part will be described in detail. The filtered-water discharge part is configured to discharge filtered water that is treated by the separation membrane module 700 to an outside. Since the filtered-water discharge part commonly includes a flexible pipe, the filtered-water discharge part is not damaged and the filtered water is easily recovered, in spite of the reciprocating motion of the separation membrane module 700.

First Exemplary Embodiment

Figure 28:
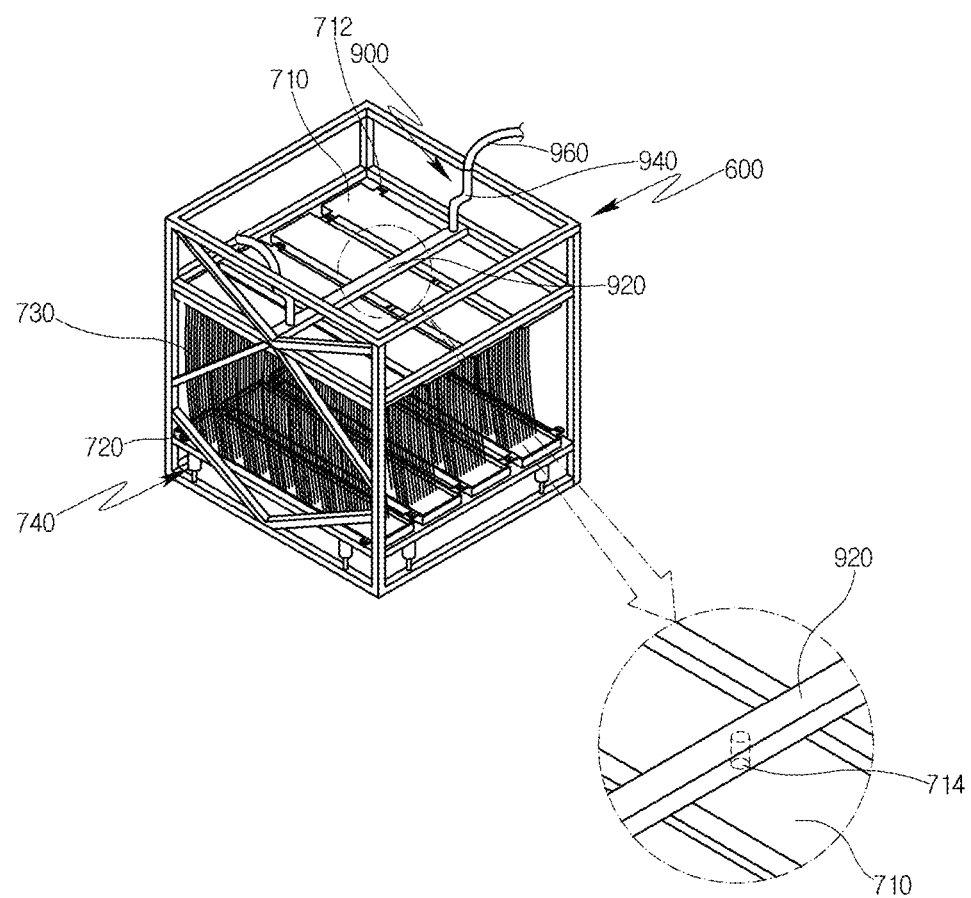
FIG. 28 is a view illustrating a first exemplary embodiment of a filtered-water discharge part of FIG. 1.

A filtered-water discharge part 900 according to a first exemplary embodiment will be described with reference to FIG. 28. This exemplary embodiment is applied to the arrangement of the membrane support frame 600 and the separation membrane module 700 according to the first exemplary embodiment shown in FIG. 23.

The filtered-water discharge part 900 may include a water collection pipe 920, a first recovery pipe 940 and a second recovery pipe 960. As illustrated in FIG. 23, when the plurality of separation membrane modules 700 is arranged in the membrane support frame 600, sewage (or waste water) is filtered from an outside to an inside through the hollow fiber membrane 730 of each separation membrane module and is collected in the sump 711 of the upper frame.

One or more discharge holes are formed in an upper side of each upper frame 710, and the water collection pipe 920 is installed to communicate with the sump 711 of each separation membrane module via the discharge holes. That is, the water collection pipe 920 crosses the plurality of separation membrane modules 700 and is installed to communicate with each sump 711. Thus, the filtered water collected in each sump 711 may be gathered in one water collection pipe 920.

According to this exemplary embodiment, the water collection pipe 920 communicates with each sump 711 via one discharge hole formed in a center of each upper frame 710. One water collection pipe is installed with respect to the membrane support frame 600. However, without being limited thereto, according to the length of the upper frame 710, a plurality of discharge holes may be formed in the upper side and a plurality of water collection pipes 920 may be installed.

In order to recover the filtered water gathered in the water collection pipe 920, one or more first recovery pipes 940 may be coupled to the water collection pipe 920. According to this exemplary embodiment, two first recovery pipes 940 are coupled to both ends of the water collection pipe 920. The first recovery pipe 940 is made of a rigid pipe, and may have an S shape, a straight-line shape, and other shapes.

The second recovery pipe 960 is connected to each first recovery pipe 940. The second recovery pipe 960 is characterized by a flexible pipe. Thus, even if the separation membrane modules 700 are reciprocated, the filtered-water discharge part 900 is not damaged and the filtered water is easily recovered.

A suction pump (not shown) may be connected to the second recovery pipe 960 to pump influent water from the outside of the hollow fiber membrane 730 to the inside thereof and then filter the water. The filtered water recovered through the second recovery pipe 960 by the suction force may be stored in a separate tank (not shown).

That is, the filtered water that is filtered while flowing from the outside of the hollow fiber membrane 730 of the separation membrane module 700 to the inside thereof is first gathered in the sump 711 of the upper frame 710. The filtered water gathered in each sump 711 is collected in one water collection pipe 920 and passed through the first recovery pipe 940 and the second recovery pipe 960 to be recovered outside.

This exemplary embodiment separately includes a rigid first recovery pipe 940 connected to the water collection pipe 920, and a flexible and pliable second recovery pipe 960. However, the flexible pipe may be directly connected to the water collection pipe 920.

Second Exemplary Embodiment

Figure 29:
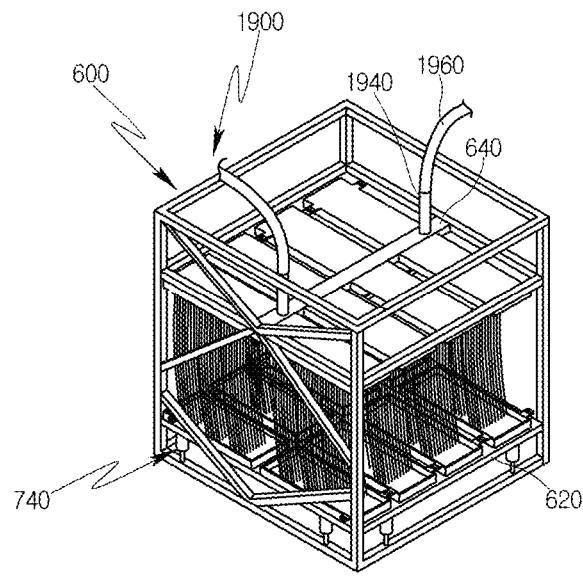
FIG. 29 is a view illustrating a second exemplary embodiment of a filtered-water discharge part.

A filtered-water discharge part 1900 according to a second exemplary embodiment will be described with reference to FIG. 29. This exemplary embodiment is applied to the arrangement of the membrane support frame 600 and the separation membrane module 700 according to the second exemplary embodiment shown in FIG. 24.

The filtered-water discharge part 1900 may include a first recovery pipe 1940 and a second recovery pipe 1960. As illustrated in FIG. 24, the membrane support frame 600 includes a filtration pipe 640 formed in a central portion on an upper side thereof. A plurality of separation membrane modules 700 is coupled to both sides of the filtration pipe 640. Here, the upper frame 710 of each separation membrane module is fitted into the coupling hole 642 formed in the filtration pipe 640. Thus, the filtered water collected in each sump 711 may be gathered in one filtration pipe 640.

In order to recover the filtered water gathered in the filtration pipe 640 to the outside, one or more first recovery pipes 1940 may be coupled to the filtration pipe 640. According to this exemplary embodiment, two first recovery pipes 1940 are coupled to both ends of the filtration pipe 640 in a longitudinal direction thereof. The first recovery pipe 1940 is made of a rigid pipe, and may have an S shape, a straight-line shape, and other shapes.

Next, the second recovery pipe 1960 is connected to each first recovery pipe 1940. The second recovery pipe 1960 is characterized by a flexible pipe. Thus, even if the separation membrane modules 700 are reciprocated, the filtered-water discharge part 1900 is not damaged and the filtered water is easily recovered.

Similar to the first exemplary embodiment, a suction pump (not shown) may be connected to the second recovery pipe 1960. The filtered water recovered through the second recovery pipe 1960 by a suction force may be stored in a separate tank (not shown).

That is, the filtered water that is filtered while flowing from the outside of the hollow fiber membrane 730 of the separation membrane module 700 to the inside thereof is first gathered in the sump 711 of the upper frame 710. The filtered water gathered in each sump 711 is collected in one filtration pipe 640 and passed through the first recovery pipe 1940 and the second recovery pipe 1960 to be recovered outside.

This exemplary embodiment separately includes a rigid first recovery pipe 1940 connected to the filtration pipe 640, and a flexible and pliable second recovery pipe 1960. However, the flexible pipe may be directly connected to the filtration pipe 640.

A structure where the plurality of membrane support frames 600 is installed in the treatment bath 300 according to respective exemplary embodiments will be described with reference to FIGS. 30 to 33.

The plurality of membrane support frames 600 is typically arranged in the treatment bath 300 according to the filtering capacity of sewage (or waste water). Here, the plurality of membrane support frames 600 may be longitudinally arranged in a row or may be arranged in multiple rows, according to a site area or the like. Hereinafter, respective exemplary embodiments will be described with reference to a structure where ten membrane support frames 600 are installed in the treatment bath 300.

First Exemplary Embodiment

According to the first exemplary embodiment, ten membrane support frames 600 are arranged in the treatment bath 300 in a row, and are connected with one reciprocating part 200 to be integrally reciprocated. This exemplary embodiment may be applied when a site in which the treatment bath 300 is installed is long in length but is narrow in width.

As described above, the reciprocating part 200 may include the reciprocating frame 250 and the drive part 205, and may be connected with the membrane support frames 600 to reciprocate the membrane support frames. Specifically, the reciprocating frame 250 is connected with the membrane support frames 600 to support the membrane support frames 600. The drive part 205 is disposed in the treatment bath 300 and connected to a side of the reciprocating frame 250 to move the reciprocating frame 250. According to this exemplary embodiment, since the plurality of membrane support frames 600 should be reciprocated by one reciprocating part 200, a large driving force is required.

Figure 30:
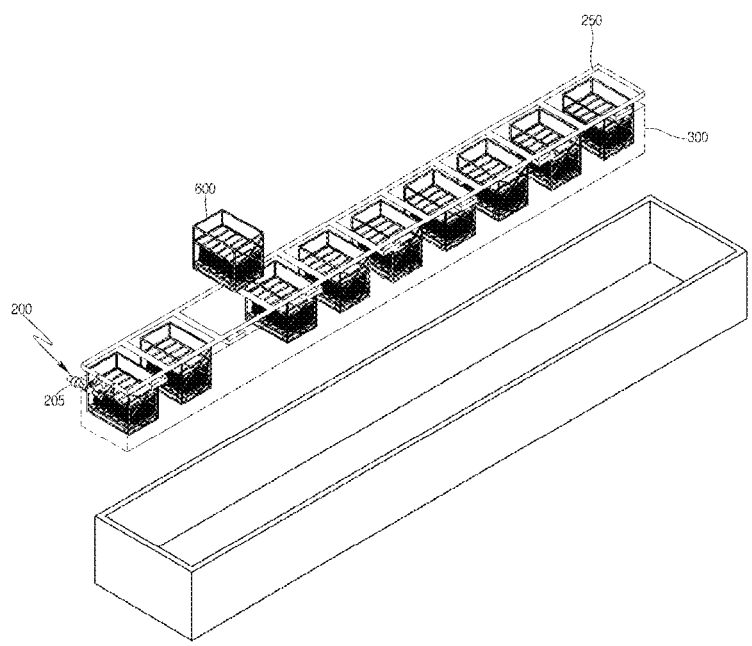
FIG. 30 is a view illustrating an exemplary arrangement of the membrane support frame according to a first exemplary embodiment.

In this exemplary embodiment, since ten membrane support frames 600 are connected with one reciprocating means 200, the ten membrane support frames 600 are arranged in the one reciprocating frame 250 in a row. Here, all of the ten membrane support frames 600 may be connected and installed in a row in the reciprocating frame 250 having one compartment. However, as illustrated in FIG. 30, the reciprocating frame 250 may be formed to have the same number of compartments as the membrane support frames 600 that are to be installed. That is, in this exemplary embodiment, the reciprocating frame 250 may be formed to have ten compartments, so that each membrane support frame 600 may be installed in an associated compartment. Thus, when the membrane support frame 600 is damaged or has a problem, each membrane support frame may be individually replaced with a new one to make installation more convenient.

Second Exemplary Embodiment

According to a second exemplary embodiment, ten membrane support frames 600 are arranged in a row in the treatment bath 300 to be divided into two sets, each having five frames. Each set is connected with an associated reciprocating part 200. Thus, each set having five membrane support frames 600 may be separately reciprocated. That is, both sets of membrane support frames may be reciprocated in the same direction or may be reciprocated in different directions.

Similar to the first exemplary embodiment, this exemplary embodiment may be applied when a site in which the treatment bath 300 is installed is long in length but is narrow in width. Specifically, according to this exemplary embodiment, the ten membrane support frames 600 are divided into two sets. Each set is connected with one reciprocating part 200. Thus, the reciprocating part 200 are installed at both sides of the treatment bath 300, respectively. The five membrane support frames 600 as one set are arranged in a row in one reciprocating frame 250.

Figure 31:
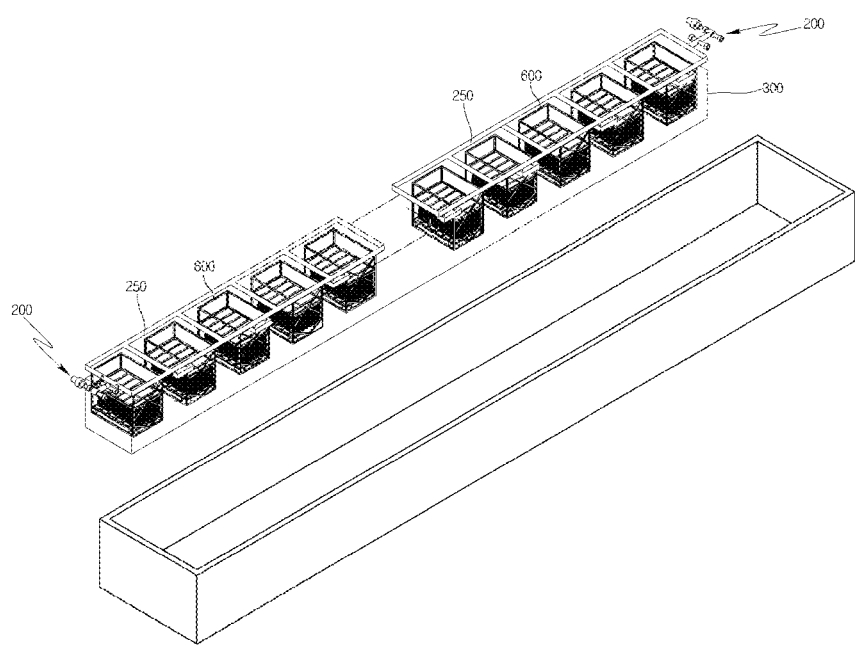
FIG. 31 is a view illustrating an exemplary arrangement of the membrane support frame according to a second exemplary embodiment.

All of the five membrane support frames 600 constituting one set may be connected and installed in a row in the reciprocating frame 250 having one compartment. However, as illustrated in FIG. 31, each reciprocating frame 250 may be formed to have the same number of compartments as the membrane support frames 600 that are to be installed. That is, in this exemplary embodiment, each of the reciprocating frames 250 may be formed to have five compartments, so that each membrane support frame 600 may be installed in an associated compartment. Thus, when the membrane support frame 600 is damaged or has a problem, each membrane support frame 600 may be individually replaced with a new one to make installation more convenient.

Unlike the first exemplary embodiment, this exemplary embodiment does not integrally reciprocate the ten membrane support frames by one reciprocating part, but divides the membrane support frames into two sets, each having five membrane support frames 600 and connects each set to an associated reciprocating part 200. Thus, a large driving force is not required and each set having the five membrane support frames 600 may be reciprocated in opposite directions at intervals, thus producing a vortex and attaining a sludge floating effect.

Third Exemplary Embodiment

According to a third exemplary embodiment, ten membrane support frames 600 are divided into two rows, each having five frames, in the treatment bath 300. Here, the membrane support frames 600 are connected to one reciprocating part 200 to be integrally reciprocated.

This exemplary embodiment may be applied when a site in which the treatment bath 300 is installed is wide in width but is short in length. Specifically, according to this exemplary embodiment, ten membrane support frames 600 are connected with one reciprocating part 200. Thus, the ten membrane support frames 600 are arranged in parallel in two rows in one reciprocating frame 250.

Figure 32:
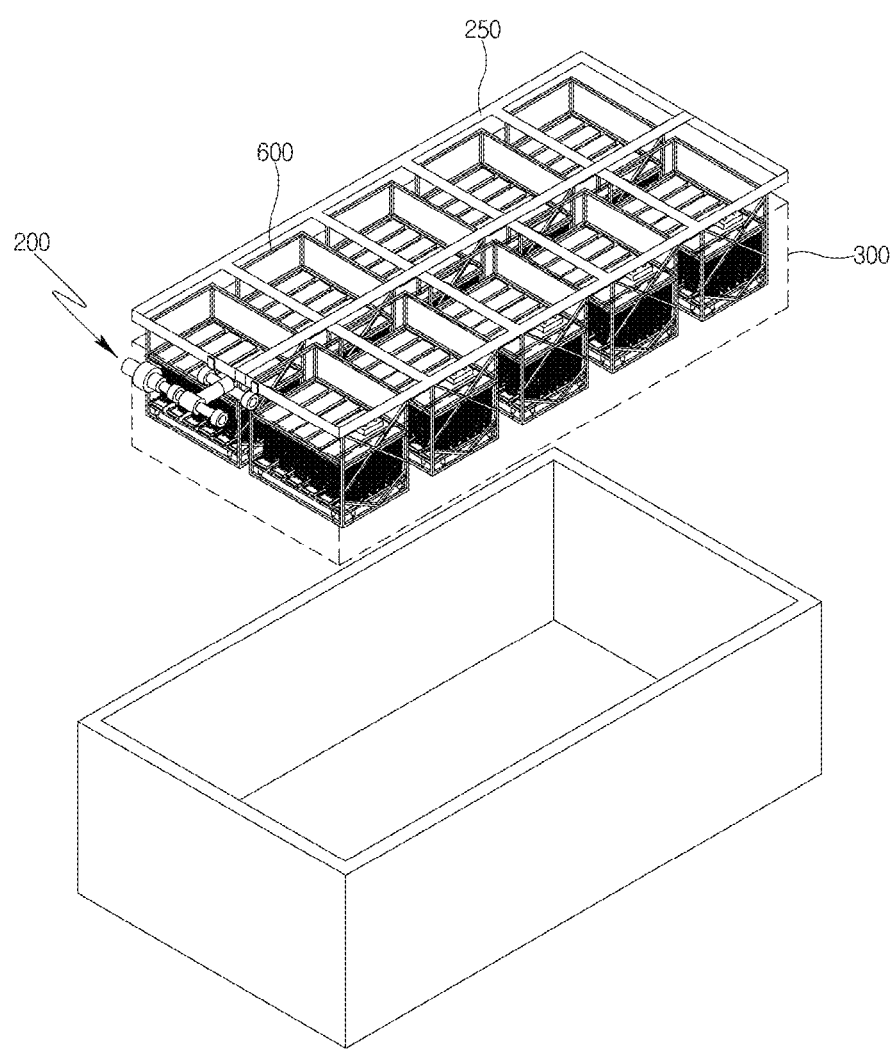
FIG. 32 is a view illustrating an exemplary arrangement of the membrane support frame according to a third exemplary embodiment.

All of the ten membrane support frames 600 may be connected and installed in the reciprocating frame 250 having one compartment, while the frames are divided into two rows, each having five frames. However, as illustrated in FIG. 32, the reciprocating frame 250 may be formed to have the same number of compartments as the membrane support frames 600 that are to be installed. That is, in this exemplary embodiment, the reciprocating frame 250 may be formed to have two rows of compartments, each row having five compartments, a total of ten compartments, so that each membrane support frame 600 may be installed in an associated compartment. Thus, when a membrane support frame 600 is damaged or has a problem, each membrane support frame 600 may be individually replaced with a new one to make installation more convenient.

According to this exemplary embodiment, since the plurality of membrane support frames 600 should be reciprocated by one reciprocating part 200, a large driving force is required.

Fourth Exemplary Embodiment

According to a fourth exemplary embodiment, ten membrane support frames 600 are divided into two sets, each having five frames, and arranged in two rows in the treatment bath 300. Each row is connected with a separate reciprocating part 200. Thus, each row of membrane support frame set may be separately reciprocated. That is, respective set of membrane support frames may be reciprocated in the same direction or in different directions.

Similar to the third exemplary embodiment, this exemplary embodiment may be applied when a site in which the treatment bath 300 is installed is wide in width but is short in length. Specifically, according to this exemplary embodiment, ten membrane support frames 600 are divided into the two rows and each row is connected with one reciprocating part 200. Thus, two reciprocating parts 200 are installed in parallel on a side of the treatment bath 300. The five membrane support frames 600 of one set are arranged in a row in one reciprocating frame 250.

Figure 33:
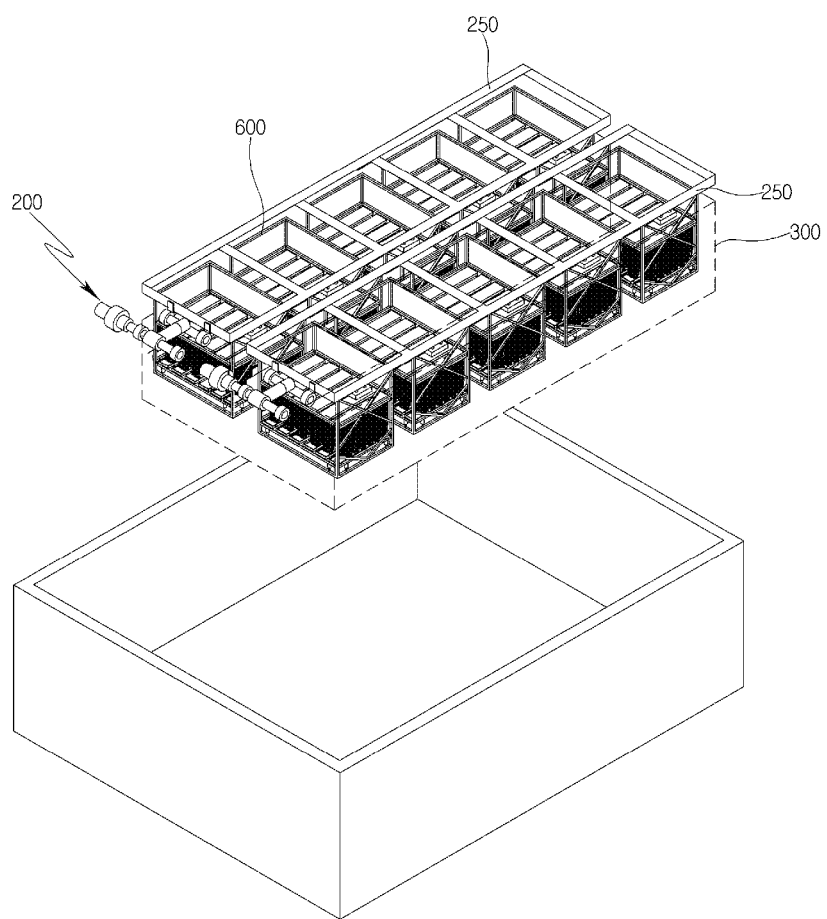
FIG. 33 is a view illustrating an exemplary arrangement of the membrane support frame according to a fourth exemplary embodiment.

All of the five membrane support frames 600 of one set may be connected and installed in a row in the reciprocating frame 250 having one compartment. However, as illustrated in FIG. 33, the reciprocating frame 250 may be formed to have the same number of compartments as the membrane support frames 600 that are to be installed. That is, in this exemplary embodiment, the reciprocating frame 250 may be formed to have five compartments, so that each membrane support frame 600 may be installed in an associated compartment. Thus, when the membrane support frame 600 is damaged or has a problem, each membrane support frame may be individually replaced with a new one to make installation more convenient.

Unlike the third exemplary embodiment, this exemplary embodiment does not integrally reciprocate the ten membrane support frames by one reciprocating part but divides the membrane support frames 600 into two rows, each having five frames, and each row is connected with an associated reciprocating part 200. Such a structure does not require a large driving force, and may reciprocate the respective rows of membrane support frames in opposite directions at intervals, thus producing a vortex and attaining a sludge floating effect.

As the respective rows reciprocate in different directions, vibrations caused by the reciprocating motion may be offset. Consequently, vibration generated in the treatment bath 300 is reduced and thereby a stable operation is guaranteed.

Hereinafter, the control part 1000 according to an exemplary embodiment and a method of controlling the membrane filtration system using the control part will be described.

As shown in FIG. 1, the membrane filtration system of the exemplary embodiment may further include the control part 1000 to control the reciprocating distance or frequency of the separation membrane module 700. The control part 1000 regulates a reciprocating distance or frequency of the separation membrane in the separation membrane module 700 depending on an operating condition, a contamination level of the separation membrane module 700, and other conditions. In this exemplary embodiment, the control part 1000 may include a contamination measuring part 1200 that measures the contamination level of the separation membrane module 700, and a regulating control part 1400 that controls the reciprocating distance or frequency of the separation membrane module 700 depending on the contamination level measured by the contamination measuring part 1200.

The contamination measuring part 1200 may measure the contamination level of the separation membrane module 700 by measuring the transmembrane pressure (TMP) of the separation membrane. In the membrane filtration system of the exemplary embodiment, the contamination level of the separation membrane module 700 may be low in an initial operation or in an operation after backwash. After filtration is performed for a considerable period of time, the contamination level of the separation membrane module 700 may be high.

Thus, the regulating control part 1400 increases the reciprocating frequency of the separation membrane module 700 as the contamination level of the separation membrane module 700 becomes high, and reduces the reciprocating frequency of the separation membrane module 700 as the contamination level of the separation membrane module 700 becomes low. That is, as the contamination level becomes high, the reciprocating period of the separation membrane module 700 is reduced. Further, as the contamination level becomes low, the reciprocating period of the separation membrane module 700 is increased.

If the frequency of the separation membrane module 700 increases, the separation membrane reciprocates at higher speed and inertial force acting on the separation membrane increases, thus detaching or removing contaminants from the separation membrane. However, if the frequency increases, energy consumption increases. Thus, the frequency is appropriately regulated according to the contamination level of the separation membrane module 700, so that it is possible to effectively remove fouling from the separation membrane by the reciprocating motion while reducing the energy consumption.

Since the separation membrane module 700 is reciprocated together with the membrane support frame 600 in which the separation membrane module 700 is installed, and the membrane support frame 600 is supported on the reciprocating frame 250, it is possible to regulate the separation membrane module 700 by regulating the reciprocating distance and frequency (period) of the reciprocating frame 250. Thus, the regulating control part 1400 may control the speed of the motor 210 that is connected with the reciprocating part 200 to transmit power.

According to this exemplary embodiment, the separation membrane module 700 may be set to reciprocate at 0.5 Hz, and may be regulated up to 1 Hz according to the contamination level of the separation membrane. However, if the frequency exceeds 1 Hz, the energy consumption increases, and the structure of the membrane filtration system may be undesirably damaged.

Further, the regulating control part 1400 may increase the reciprocating distance of the separation membrane module 700 as the contamination level of the separation membrane module 700 becomes high, and reduces the reciprocating distance of the separation membrane module 700 as the contamination level of the separation membrane module 700 becomes low. That is, if the reciprocating distance of the separation membrane module 700 increases when the frequency is kept constant, the reciprocating speed of the separation membrane increases, thus having effect similar to that obtained when the frequency is increased. If the frequency becomes too high, the structure of the system may be damaged due to the vibration caused by the reciprocating motion, so the reciprocating distance should be decreased.

If the reciprocating distance of the separation membrane module 700 increases, the separation membrane reciprocates at higher speeds and inertial force acting on the separation membrane increases. Thus, it is possible to detach and remove contaminants from the separation membrane.

Since the separation membrane module 700 reciprocates along with the membrane support frame 600 and the reciprocating frame 250, it is possible to regulate the reciprocating distance of the separation membrane module 700 by regulating the reciprocating distance of the reciprocating frame 250. Thus, the regulating control part 1400 may be connected with the reciprocating part 200 to regulate and control the reciprocating distance of the reciprocating frame 250.

Specifically, as described above, the drive part 205 may include a motor 210, a first pulley 211, a second pulley 213, a rotor 230, and a link rod 220. The motor 210 and the rotor 230 are rotatably connected to each other via the first pulley 211 and the second pulley 213. The link rod 220 is connected between the rotor 230 and the reciprocating frame 250 to convert a rotating motion into a reciprocating motion.

Here, a plurality of connecting holes 233 connected with the link rod 220 is formed in the rotor 230. Thus, if the connecting hole 233 at which the link rod 220 is connected to the rotor is changed, it is possible to regulate the reciprocating distance of the reciprocating frame 250.

When the contamination level of the separation membrane module 700 is high and thus it is required to increase the reciprocating distance of the separation membrane module 700, the regulating control part 1400 connects the link rod 220 to a connecting hole 233b that is relatively distant from the center of the rotor 230, so that it is possible to increase the reciprocating distance of the reciprocating frame 250. Conversely, when the contamination level of the separation membrane module 700 is low and thus it is required to reduce the reciprocating distance of the separation membrane module 700, the regulating control part 1400 connects the link rod 220 to a connecting hole 233a that is relatively near to the center of the rotor 230, so that it is possible to increase the reciprocating distance of the reciprocating frame 250.

Moreover, the link rod 220 includes a link body 221, a first link hole 223 disposed on one side of the link body 221 and connected to the connecting hole 233 of the rotor, and a second link hole 225 disposed on the other side of the link body 221 and connected to the reciprocating frame 250. A plurality of first link holes 223 may be formed in a longitudinal direction of the link body 221. Thus, if the first link hole 223 of the link rod connected with the connecting hole 233 of the rotor is changed, it is possible to regulate and control the reciprocating distance of the reciprocating frame 250.

When the contamination level of the separation membrane module 700 is high and thus it is required to increase the reciprocating distance of the separation membrane module 700, the regulating control part 1400 fastens the connecting hole 233 of the rotor to a first link hole 223b that is relatively distant from the second link hole 225 of the link rod 220, so that it is possible to increase the reciprocating distance of the reciprocating frame 250. Conversely, when the contamination level of the separation membrane module 700 is low and thus it is required to reduce the reciprocating distance of the separation membrane module 700, the regulating control part 1400 fastens the connecting hole 233 of the rotor to a first link hole 223a that is relatively near to the second link hole 225 of the link rod 220, so that it is possible to reduce the reciprocating distance of the reciprocating frame 250.

Further, according to an exemplary embodiment, the regulating control part 1400 may control to increase the frequency during the backwash of the separation membrane module 700. According to this exemplary embodiment, it is possible to increase the frequency to 0.7 Hz during the backwash of the separation membrane module 700, thus enhancing washing efficiency.

The above description is only a specific exemplary embodiment of the membrane filtration system. The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A membrane filtration system, comprising:
   a treatment bath;
   a membrane support frame disposed in the treatment bath and coupled to a reciprocating frame;
   a separation membrane module that is installed in the membrane support frame and exhibits a transmembrane pressure (TMP) level during operation of the membrane filtration system;
   a contamination level sensor configured to measure the TMP level of the separation membrane module to determine a contamination level of the separation membrane module;
   a reciprocator coupled to the reciprocating frame to reciprocate the membrane support frame by driving a motor configured to rotate a rotor at a predetermined speed; and
   a link rod connected between the rotor and the reciprocating frame to convert a rotating motion of the rotor into a reciprocating motion of the reciprocating frame, the link rod enabling a reciprocating distance of the separation membrane module to be set according to the contamination level of the separation membrane module,
   wherein the link rod comprises a link body including a first end disposed toward the rotor and a second end disposed toward the reciprocating frame, the first end having a plurality of first link holes arranged in a longitudinal direction of the link body, the second end having a second link hole coupled to the reciprocating frame, the plurality of first link holes including a predetermined first link hole fixed to the rotor, the predetermined first link hole selected from the plurality of first link holes according to the contamination level of the separation membrane module.

2. The membrane filtration system according to claim 1, wherein the predetermined first link hole is closer to the second end for lower levels of contamination of the separation membrane module and is farther from the second end for higher levels of contamination of the separation membrane module.

3. The membrane filtration system according to claim 1, wherein the contamination level sensor is further configured to measure the TMP level of the separation membrane module at a predetermined time after an initial operation of the membrane filtration system and during backwash of the separation membrane module.

4. The membrane filtration system according to claim 3, further comprising a regulating controller configured to control a reciprocating frequency of the separation membrane module by varying the predetermined speed of the motor, the reciprocating frequency depending on the contamination level of the separation membrane module,
   wherein the regulating controller is further configured to increase the reciprocating frequency during backwash of the separation membrane module.

5. The membrane filtration system according to claim 4, wherein the regulating controller is further configured to increase the reciprocating frequency of the separation membrane module as the contamination level of the separation membrane module becomes high and to reduce the reciprocating frequency of the separation membrane module as the contamination level of the separation membrane module becomes low.

6. The membrane filtration system according to claim 4, wherein the regulating controller is further configured to select the predetermined first link hole of the link rod based on the contamination level of the separation membrane module.

7. The membrane filtration system according to claim 1, wherein the reciprocator comprises:
   the reciprocating frame; and
   a drive part disposed in the treatment bath, connected to a side of the reciprocating frame, and configured to move the reciprocating frame, the drive part comprising the motor, which is disposed in the treatment bath; a first pulley mounted to a shaft of the motor; a second pulley connected with the first pulley via a power transmission belt to receive a rotating motion from the first pulley; the rotor, which is connected to a rotating shaft of the second pulley; and the link rod.

8. The membrane filtration system according to claim 7, wherein the membrane support frame consists of a plurality of membrane support frames arranged in a row in the reciprocating frame and collectively driven by the drive part, and wherein the reciprocator is disposed on a side of the treatment bath.

9. The membrane filtration system according to claim 7, wherein the reciprocator consists of the plurality of reciprocators including one reciprocator disposed on a first side of the treatment bath and another reciprocator disposed on a second side of the treatment bath opposite to the first side; wherein the drive part consists of a plurality of drive parts; and wherein the membrane support frame consists of a plurality of membrane support frames arranged in each of a plurality of rows in the reciprocating frame, each row being driven by a different drive part of the plurality of drive parts.

10. The membrane filtration system according to claim 1, further comprising a sludge floating part including a vane extending from a bottom side of the membrane support frame, the vane configured to lift sludge accumulated in a bottom of the treatment bath, the sludge being lifted from the bottom of the treatment bath when the membrane support frame is reciprocated by the reciprocator, thereby causing the lifted sludge to float so as to prevent the sludge from staying in the treatment bath.

11. A membrane filtration system, comprising:
   a treatment bath;
   a membrane support frame disposed in the treatment bath and coupled to a reciprocating frame;
   a separation membrane module that is installed in the membrane support frame and exhibits a transmembrane pressure (TMP) level during operation of the membrane filtration system;
   a contamination level sensor configured to measure the TMP level of the separation membrane module to determine a contamination level of the separation membrane module;
   a reciprocator coupled to the reciprocating frame to reciprocate the membrane support frame by driving a motor configured to move a link rod having a second end fixed to the reciprocating frame; and
   a rotor rotated by the motor at a predetermined speed and connected to a second end of the link rod to move the link rod in a reciprocating direction of the membrane support frame, the rotor enabling a reciprocating distance of the separation membrane module to be set according to the contamination level of the separation membrane module,
   wherein the rotor includes a disc through which a plurality of connecting holes are formed, each of the plurality of connecting holes being connectable to a first end of the link rod being disposed at a different interval from a center of the rotor, the plurality of connecting holes including a predetermined connecting hole connected to the first end of the link rod, the predetermined connecting hole selected from the plurality of connecting holes according to the contamination level of the separation membrane module.

12. The membrane filtration system according to claim 11, wherein the predetermined connecting hole is closer to the center of the rotor for lower levels of contamination of the separation membrane module and is farther from the center of the rotor for higher levels of contamination of the separation membrane module.

13. The membrane filtration system according to claim 11, wherein the contamination level sensor is further configured to measure the TMP level of the separation membrane module at a predetermined time after an initial operation of the membrane filtration system and during backwash of the separation membrane module.

14. The membrane filtration system according to claim 11, further comprising a regulating controller configured to control a reciprocating frequency of the separation membrane module by varying the predetermined speed of the motor, the reciprocating frequency depending on the contamination level of the separation membrane module.

15. The membrane filtration system according to claim 14, wherein the regulating controller is further configured to increase the reciprocating frequency of the separation membrane module as the contamination level of the separation membrane module becomes high and to reduce the reciprocating frequency of the separation membrane module as the contamination level of the separation membrane module becomes low.

16. The membrane filtration system according to claim 14, wherein the regulating controller is further configured to select the predetermined connecting hole of the rotor based on the contamination level of the separation membrane module.

17. The membrane filtration system according to claim 11, wherein the reciprocator comprises:
   the reciprocating frame; and
   a drive part disposed in the treatment bath, connected to a side of the reciprocating frame, and configured to move the reciprocating frame, the drive part comprising the motor, which is disposed on the treatment bath; a first pulley mounted to a shaft of the motor; a second pulley connected with the first pulley via a power transmission belt to receive a rotating motion from the first pulley; the rotor, which is connected to a rotating shaft of the second pulley; and the link rod, which is connected between the rotor and the reciprocating frame to convert a rotating motion of the rotor into a reciprocating motion of the reciprocating frame.

18. The membrane filtration system according to claim 17, wherein the membrane support frame consists of a plurality of membrane support frames arranged in a row in the reciprocating frame and collectively driven by the drive part, and wherein the reciprocator is disposed on a side of the treatment bath.

19. The membrane filtration system according to claim 17, wherein the reciprocator consists of the plurality of reciprocators including one reciprocator disposed on a first side of the treatment bath and another reciprocator disposed on a second side of the treatment bath opposite to the first side; wherein the drive part consists of a plurality of drive parts; and wherein the membrane support frame consists of a plurality of membrane support frames arranged in each of a plurality of rows in the reciprocating frame, each row being driven by a different drive part of the plurality of drive parts.

20. A membrane filtration system, comprising:
a treatment bath;
a membrane support frame disposed in the treatment bath and coupled to a reciprocating frame;
a separation membrane module that is installed in the membrane support frame and exhibits a transmembrane pressure (TMP) level during operation of the membrane filtration system;
a contamination level sensor configured to measure the TMP level of the separation membrane module to determine a contamination level of the separation membrane module;
a reciprocator coupled to the reciprocating frame to reciprocate the membrane support frame by driving a motor at a predetermined speed; and
a rotor rotated by the motor and connected to a second end of a link rod to move the link rod in a reciprocating direction of the membrane support frame, the rotor enabling a reciprocating distance of the separation membrane module to be set according to the contamination level of the separation membrane module,
wherein the link rod is connected between the rotor and the reciprocating frame to convert a rotating motion of the rotor into a reciprocating motion of the reciprocating frame, the link rod enabling a reciprocating distance of the separation membrane module to be set according to the contamination level of the separation membrane module,
wherein the link rod comprises a link body including a first end disposed toward the rotor and the second end disposed toward the reciprocating frame, the first end having a plurality of first link holes arranged in a longitudinal direction of the link body, the second end having a second link hole coupled to the reciprocating frame, the plurality of first link holes including a predetermined first link hole fixed to the rotor, the predetermined first link hole selected from the plurality of first link holes according to the contamination level of the separation membrane module, and wherein the predetermined first link hole is closer to the second end for lower levels of contamination of the separation membrane module and is farther from the second end for higher levels of contamination of the separation membrane module; and
wherein the rotor includes a disc through which a plurality of connecting holes are formed, each of the plurality of connecting holes being connectable to a first end of the link rod being disposed at a different interval from a center of the rotor, the plurality of connecting holes including a predetermined connecting hole connected to the first end of the link rod, the predetermined connecting hole selected from the plurality of connecting holes according to the contamination level of the separation membrane module, and wherein the predetermined connecting hole is closer to the center of the rotor for lower levels of contamination of the separation membrane module and is farther from the center of the rotor for higher levels of contamination of the separation membrane module.

* * * * *